United States Patent [19]

Imaizumi et al.

[11] Patent Number: 5,830,965
[45] Date of Patent: *Nov. 3, 1998

[54] POLYMER CONTAINING A MODIFIED CYCLIC MONOMER UNIT

[75] Inventors: Kimio Imaizumi, Kiyose; Itaru Natori, Yokohama; Hideyuki Yamagishi, Tokyo; Kiyoo Kato, Kawasaki, all of Japan

[73] Assignee: Asahi Kasei Kogyo Kabushiki Kaisha, Osaka, Japan

[*] Notice: The term of this patent shall not extend beyond the expiration date of Pat. No. 5,795,945.

[21] Appl. No.: 652,455

[22] PCT Filed: Nov. 21, 1994

[86] PCT No.: PCT/JP94/01969

§ 371 Date: Jun. 5, 1996

§ 102(e) Date: Jun. 5, 1996

[87] PCT Pub. No.: WO95/21202

PCT Pub. Date: Aug. 10, 1995

[30] Foreign Application Priority Data

Feb. 1, 1994 [JP] Japan .................................... 6-010567

[51] Int. Cl.$^6$ .............................. C08F 32/02; C08F 32/04
[52] U.S. Cl. ..................... 526/309; 526/180; 526/308; 526/337; 526/340; 526/347; 526/347.1; 525/356
[58] Field of Search ..................... 526/308, 337, 526/180, 309; 525/356

[56] References Cited

U.S. PATENT DOCUMENTS

| H1564 | 7/1996 | St. Clair ..................................... 525/98 |
| 4,020,251 | 4/1977 | Hsieh . |
| 4,051,199 | 9/1977 | Udipi et al. . |
| 4,113,930 | 9/1978 | Moczygemba . |
| 4,127,710 | 11/1978 | Hsieh . |
| 4,131,653 | 12/1978 | Hsieh et al. . |
| 4,138,536 | 2/1979 | Hsieh . |
| 4,179,480 | 12/1979 | Hsieh . |
| 4,237,246 | 12/1980 | Hsieh . |
| 4,578,429 | 3/1986 | Gergen ..................................... 525/291 |
| 4,918,133 | 4/1990 | Moriya ..................................... 524/518 |

FOREIGN PATENT DOCUMENTS

| 2848964 | 5/1980 | Germany . |
| 1042625 | 9/1966 | United Kingdom . |

OTHER PUBLICATIONS

Horne, Jr. et al., *Ind. Eng. Chem.*, vol. 48, No. 4, pp. 784–791 (1956).
Zhiquan et al., *J. Polym. Sci., Polym. Chem. Ed.*, vol. 18, pp. 3345–3357 (1980).
Jihua et al., *Scientia Sinica*, vol. 23, No. 6 pp. 734–743 (1980).
A. Mazzei, *Makromol. Chem. Suppl.*, vol. 4, pp. 61–72 (1981).
Hsieh et al., *Rubber Chem. Technol.*, vol. 58, No. 1, pp. 117–145 (1985).
J. Witte, *Angew. Makromol. Chem.*, vol. 94, No. 1443, pp. 119–146 (1981).
Yang et al., *Macromolecules*, vol. 15, No. 2, pp. 230–233 (1982).
Marvel et al., *J. Am. Chem. Soc.*, vol. 81, pp. 448–452 (1959).
Lefebvre et al., *J. Polym. Sci., Part A*, vol. 2, pp. 3277–3295 (1964).
Cassidy et al., *J. Polym. Sci., Part A*, vol. 3, pp. 1553–1565 (1965).
Mango et al., *Polymer Preprints*, vol. 12, No. 2, pp. 402–409 (1971).
Mango et al., *Die Makromolekulare Chemie*, vol. 163, pp. 13–36 (1973).
Dolgoplosk et al., *European Polymer Journal*, vol. 9, pp. 895–908 (1973).
Nagai et al., *Kobunshi Ronbun-shu*, vol. 34, No. 5, pp. 333–340 (1977) (abstract at end of document).
Sharaby et al., *J. Polym. Sci., Poly. Chem. Ed.*, vol. 20, pp. 901–915 (1982).
François et al., *Makromol. Chem.*, vol. 191, pp. 2743–2753 (1990).

*Primary Examiner*—Fred Zitomer
*Attorney, Agent, or Firm*—Birch, Stewart, Kolasch & Birch, LLP

[57] ABSTRACT

Disclosed is a polymer containing a modified cyclic monomer unit, comprising a polymer chain represented by the following formula (I):

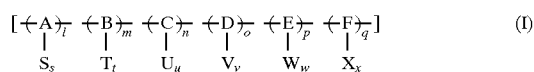

(I)

wherein A to F are monomer units constituting a main chain of the polymer chain, in which monomer units A to F are arranged in any order, and l to q are, respectively, weight percentages of monomer units A to F, based on the total weight of monomer units A to F; A is selected from cyclic olefin monomer units, B is selected from cyclic conjugated diene monomer units, and C to F are monomer units copolymerizable with monomer units A and B, wherein each of S to X, which are modifying groups, is a functional group or an organic compound residue containing the functional group, with the functional group containing at least one member selected from oxygen, nitrogen, sulfur, silicon, phosphorus and halogen; and wherein s to x are, respectively, weight percentages of modifying groups S to X, based on the weight of the polymer, and wherein the polymer has a number average molecular weight of from 10,000 to 5,000,000. The modified polymer of the present invention has excellent thermal properties, and is also advantageous in that it can be provided in the form of a modified copolymer of a cyclic olefin monomer and/or a cyclic conjugated diene monomer with a comonomer copolymerizable with the cyclic monomer, wherein the content of comonomer and the configuration of the copolymer can be appropriately selected in accordance with desired thermal and mechanical properties.

12 Claims, 5 Drawing Sheets

POLYMER CONTAINING A MODIFIED CYCLIC MONOMER UNIT

BACKGROUND OF THE INVENTION

1. Technical Field

The present invention relates to a novel polymer containing a modified cyclic monomer unit and a method for producing the same. More particularly, the present invention is concerned with a novel polymer containing a modified cyclic monomer unit derived from a cyclic conjugated diene, which polymer not only has stable mechanical properties which are unlikely to suffer an unfavorable change at ambient temperatures, but also possesses advantages such that, for example, when the polymer is combined with other polymers to provide composite resin materials, the resultant composite resin materials are imparted with stable and excellent mechanical properties. The present invention is also concerned with a method for producing such a novel excellent polymer.

2. Prior Art

In recent years, polymer chemistry has continuously made progress through various innovations in order to meet commercial demands which have been increasingly diversified. Especially in the field of polymer materials to be used as commercially important materials, extensive and intensive studies have been made toward developing polymers having more excellent thermal and mechanical properties. Various proposals have been made with respect to such polymers and methods for the production thereof.

Polymer materials are advantageous in that they have light weight and have a large freedom of selection with respect to the shapes of ultimate molded products, and that a wide variety of unique properties can be exhibited in accordance with the types of polymer materials used. Therefore, polymer materials are used in an extremely wide variety of application fields, such as those for automobile parts, electric and electronic parts, railroad parts, aircraft parts, fibers, clothes, medical equipment parts, packaging materials for drugs and foods and materials for general miscellaneous goods. Further, in accordance with the diversification of commercial demands and the progress of technology, the importance of polymer materials has been increasing by great leaps.

In recent years, due to a rise in the consciousness about environmental problems, with respect to materials to be used in, for example, the fields of automobile parts, electric and electronic parts and the like, a demand for decreasing the number of the types of necessary materials so as to decrease the weight and number of parts, has been rapidly increasing. For the purpose of meeting this demand, energetic researches have been widely conducted on how to replace structural non-polymer materials with polymer materials and how to decrease the number of the types of structural materials.

However, as one of the most important problems which must be solved for developing polymer materials, especially organic polymer materials, which can be widely used as structural materials, there is a problem inherent in conventional polymer materials, namely a problem that polymer materials exhibit a considerably large change in mechanical properties in accordance with changes in ambient temperature.

The reason for the occurrence of the above-mentioned phenomenon with conventional polymer materials is generally presumed to be as follows. When the ambient temperature of a polymer material is elevated to a temperature which is higher than the glass transition temperature (Tg) of the polymer material, the molecular chain of the polymer is changed from a glassy state to a rubbery state, and this change of state becomes a main cause for a considerably larger change in mechanical properties. Therefore, it has, in principle, been impossible to solve this problem insofar as a polymer material having a single molecular structure is used, so that extensive and intensive studies have been made for solving the problem by using a combination of a plurality of different types of polymer materials.

For example, in order to obtain a polymer material having mechanical properties (such as thermal stability with respect to rigidity and mechanical strength, impact resistance and dimensional stability) which are not only improved, but also are unlikely to suffer an unfavorable change at ambient temperatures, it has been attempted to use a polymer material in combination with other polymers, which are different from the polymer material in glass transition temperature (Tg), to obtain composite polymer materials, or to copolymerize a plurality of types of monomers to thereby produce a polymer material comprising a copolymer chain having segments which are different in glass transition temperature.

Examples of such conventional techniques include:

a method in which a polymer, which has a relatively high melting temperature (Tm) but does not have a satisfactorily high Tg [such as a polyamide (PA), a polyester (PEs), a polyphenylene sulfide (PPS), a polyacetal (e.g., a polyoxymethylene, that is, POM) or a polypropylene (PP)], is used in combination with another type of polymer which has a relatively high Tg [such as a polyphenylene ether (PPE), a polycarbonate (PC), a polyarylate (PAR), a polysulfone (PSF), a polyether ketone (PEK), a polyether ether ketone (PEEK), a liquid crystal polyester (LCP) or a polystyrene (PSt)], to thereby obtain a polymer material having an improved thermal stability with respect to rigidity;

a method in which a polymer which does not have a satisfactorily low Tg [such as a polyamide (PA), a polyester (PEs), a polyphenylene sulfide (PPS), a polyacetal (e.g., a polyoxymethylene, that is, POM), a polypropylene (PP), a polyphenylene ether (PPE) or a polystyrene (PSt)], is used in combination with a polymer which has a relatively low Tg [such as an ethylene-propylene rubber (EPR), an ethylene-propylenediene terpolymer (EPDM), a styrene-butadiene rubber (SBR), a hydrogenated styrene-butadiene rubber (styrene-ethylene-butylene-styrene, that is, SEBS), a styrene-isoprene rubber (SIR), a hydrogenated styreneisoprene rubber, a butadiene rubber (BR), an isoprene rubber (IR), a chloroprene rubber (CR), a nitrile rubber (acrylonitrile-butadiene rubber, that is, NBR), an ethylene-containing ionomer, an acrylic rubber, a silicone rubber, a fluororubber, a polyamide elastomer or a polyester elastomer], to thereby obtain a polymer material having an improved impact resistance;

a method in which a polymer, such as a polystyrene (PSt), a styrene-butadiene rubber (SBR), a hydrogenated styrene-butadiene rubber (SEBS), a styrene-isoprene rubber (SIR), a hydrogenated styrene-isoprene rubber, ABS resin or AES resin, is used in combination with a polymer having a relatively high Tg, to thereby obtain a polymer material having an improved thermal stability with respect to mechanical strength; and a method in which an aromatic or aliphatic cyclic monomer unit is introduced, by copolymerization, into the molecular chain of a polymer, such as a polyamide (PA), a polyester (PEs), a polypropylene (PP) or a polyethylene (PE), to thereby obtain a polymer material having an improved thermal stability with respect to rigidity, mechanical strength and the like. Of these known methods, several methods have already been commercially practiced.

However, in these conventional techniques, it is necessary that the respective types of different polymers to be used in combination or the respective types of a monomer and a comonomer to be used in combination be largely varied depending on the properties to be improved. Therefore, these conventional methods are not always in line with the market trend that it is desired to decrease the number of the types of necessary structural materials.

As a solution to this problem, a (hydrogenated) conjugated diene polymer has been proposed. A conjugated diene polymer can be produced by living anionic polymerization, so that a conjugated diene polymer has a large freedom with respect to the designing of the molecular chain and it is relatively easy to control the properties of a conjugated diene polymer to be obtained. Therefore, it is conceivable that, when a conjugated diene polymer is used as a modifier for a polymer material, various properties of a polymer material, such as thermal stability with respect to rigidity and mechanical strength, impact resistance and dimensional stability, can be simultaneously improved by a sole modifier. Hence, researches have been intensively conducted for development of conjugated diene polymers as a representative modifier component for composite resin materials.

Representative examples of known conjugated diene polymers include homopolymers, such as a polybutadiene and a polyisoprene; copolymers of block, graft, taper and random configurations, such as a butadiene-isoprene copolymer, a styrene-butadiene copolymer, a propylenebutadiene copolymer, a styrene-isoprene copolymer, an α-methylstyrene-butadiene copolymer, an α-methylstyrene-isoprene copolymer, an acrylonitrile-butadiene copolymer, an acrylonitrile-isoprene copolymer, a butadiene-methyl methacrylate copolymer and an isoprene-methyl methacrylate copolymer; and hydrogenated polymers derived therefrom. These polymers have been used for various purposes in various fields. For example, in combination with other polymers, these conventional conjugated diene polymers have been used as plastics; elastomers; fibers; sheets; films; materials for parts for machines, containers for food, packing materials, tires and belts; insulating materials; adhesives; and the like.

For example, in the field of thermoplastic elastomers, when a conjugated diene polymer in the form of a thermoplastic elastomer is used as a modifier for improving the impact resistance of a polymer material, a conjugated diene block copolymer has conventionally been used which comprises a polymer chain composed of an agglomeration phase which is of a polymer block having a Tg (glass transition temperature) higher than room temperature, and an elastomer phase which is of a polymer block having a Tg lower than room temperature.

Representative examples of such block copolymers include a styrene-butadiene (isoprene)-styrene block copolymer and a hydrogenated product thereof.

Further, for improving various properties (such as thermal resistance, flowability and adhesion properties) of the styrene-butadiene (isoprene)-styrene block copolymer or a hydrogenated product thereof, it has been widely practiced to use the block copolymer or a hydrogenated product thereof in the form of a block copolymer composition which is obtained by blending the above-mentioned block copolymer or a hydrogenated product thereof with another polymer, such as a polystyrene, a polyolefin, a polyphenylene ether or a styrene-butadiene diblock copolymer, or a hydrogenated product thereof.

On the other hand, various proposals have been made with respect to the method for producing a conjugated diene polymer, which is also very important from a commercial point of view.

Particularly, various studies have been made with a view toward developing a polymerization catalyst capable of providing conjugated diene polymers having a high cis-1, 4-bond content, for the purpose of obtaining conjugated diene polymers having improved thermal and mechanical properties.

For example, a catalyst system comprised mainly of a compound of an alkali metal, such as lithium or sodium, and a composite catalyst system comprised mainly of a compound of a transition metal, such as nickel, cobalt or titanium, have been proposed. Some of these catalyst systems have already been employed for a commercial scale practice of the polymerization of butadiene, isoprene and the like (see, for example, Ind. End. Chem., 48, 784 (1956) and Examined Japanese Patent Application Publication No. 37-8193).

On the other hand, for not only obtaining conjugated diene polymers having a further increased cis-1,4-bond content but also providing a catalyst having a further improved polymerization activity, a number of studies have been made toward developing a composite catalyst system comprised of a rare earth metal compound and an organometallic compound containing a metal belonging to Group I, II or III of the Periodic Table. Further, in connection with the study of such a catalyst system, intensive studies have also been made with respect to highly stereospecific polymerization [see, for example, J. Polym. Sci., Polym. Chem. Ed., 18, 3345 (1980); Sci, Sinica., 2/3, 734 (1980); Makromol. Chem. Suppl, 4, 61 (1981); German Patent Application No. 2,848,964; Rubber Chem. Technol., 58, 117 (1985)].

Among these composite catalyst systems, a composite catalyst comprised mainly of a neodymium compound and an organoaluminum compound has been confirmed to have not only the ability to provide a desired polymer having a high cis-1,4-bond content, but also exhibits an excellent polymerization activity. Accordingly, this type of composite catalyst has already been commercially used as a catalyst for the polymerization of butadiene or the like [see, for example, Angew, Makromol. Chem., 94, 119 (1981); Macromolecules, 15, 230 (1982)].

However, in accordance with the recent remarkable progress of the techniques in this field, there has been a strong demand for the development of polymer materials having further improved properties, particularly excellent thermal properties (such as melting temperature, glass transition temperature and heat distortion temperature) and excellent mechanical properties (such as tensile modulus and flexural modulus).

As one of the most practical means for meeting such a demand, it has been attempted to develop a technique of improving the structures of the main molecular chains of polymers of conjugated diene monomers (in homopolymerizing or copolymerizing not only a monomer having a relatively small steric hindrance, e.g., butadiene or isoprene, but also a monomer having a large steric hindrance, e.g., a cyclic conjugated diene monomer, and, optionally, hydrogenating the resultant conjugated diene polymer, thereby forming a cyclic olefin monomer unit in the molecular chain) so as to obtain conjugated diene polymers having excellent thermal properties (such as thermal stability with respect to rigidity and mechanical strength), excellent impact resistance and excellent dimensional stability. Further, it has also been attempted to use these conjugated diene polymers in combination with other polymers so as to obtain composite resin materials having improved properties.

With respect to the homopolymerization or copolymerization of a monomer having a relatively small steric hindrance, e.g., butadiene or isoprene, catalyst systems having a polymerization activity which is satisfactory to a certain extent have been successfully developed. However, a catalyst system which exhibits a satisfactory polymerization activity in the homopolymerization or copolymerization of monomers having a large steric hindrance, e.g., a cyclic conjugated diene monomer, has not yet been developed.

That is, by conventional techniques, even homopolymerization of a cyclic conjugated diene is difficult, so that a homopolymer having a desired high molecular weight cannot be obtained. Furthermore, an attempt to copolymerize a cyclic conjugated diene with a monomer other than the cyclic conjugated diene, for the purpose of obtaining a polymer having optimized thermal and mechanical properties in order to meet a wide variety of commercial needs, has been unsuccessful with the result that the products obtained are only oligomers having a low molecular weight.

Further, the carbon-carbon double bond in a cyclic conjugated diene monomer unit of a conjugated diene polymer has a large steric hindrance. Due to this, in conventional techniques, there is a serious problem in that when it is attempted to introduce a cyclic olefin monomer unit into the molecular chain of a conjugated diene polymer by a hydrogenation reaction, the rate of the hydrogenation reaction is considerably low, so that it is extremely difficult to introduce a cyclic olefin monomer unit into the conjugated diene polymer.

As is apparent from the above, in any of the conventional techniques, it has been impossible to obtain an excellent polymer containing a cyclic conjugated diene monomer unit and/or a cyclic olefin monomer unit, which polymer can satisfy commercial demand.

With respect to the use of a cyclic conjugated diene polymer in combination with other polymers, when a combination is made between those polymers which have high compatibility with each other or one another, the resultant resin composition exhibits mechanical properties which are improved in accordance with the respective proportions of the employed component polymers. However, it is known that such an ideal combination is very limited, and most polymers have poor compatibility with other polymers. For improving compatibility between different polymers to be used in combination, it is possible to modify the polymers by bonding thereto a functional group, such as a carboxyl group, an epoxy group, a halogen atom, an amino group, an oxazoline group, an alkoxy group and an isocyanato group, by an addition reaction. However, as described above, a cyclic conjugated diene monomer unit-containing polymer which has commercially satisfactory properties has not conventionally been obtained. Hence, also, a modified cyclic conjugated diene monomer unit-containing polymer which has both commercially satisfactory properties and high compatibility with other polymers, has not conventionally been obtained. Therefore, it has been strongly desired to develop such an excellent modified cyclic conjugated diene monomer unit-containing polymer.

J. Am. Chem. Soc., 81, 448 (1959) discloses a cyclohexadiene homopolymer and a polymerization method therefor, which homopolymer is obtained by polymerizing 1,3-cyclohexadiene (a typical example of a cyclic conjugated diene monomer), using a composite catalyst comprised of titanium tetrachloride and triisobutylaluminum.

However, the polymerization method disclosed in this prior art document is disadvantageous in that the use of a large amount of the catalyst is necessary, and the polymerization reaction must be conducted for a prolonged period of time, and that the obtained polymer has only an extremely low molecular weight. Therefore, the polymer obtained by the technique of this prior art document is of no commercial value. Further, this prior art document has no teaching or suggestion of a method for introducing a cyclic olefin monomer unit into the main molecular chain of a polymer as well as modification of a polymer containing a cyclic olefin monomer unit.

J. Polym. Sci., Pt. A, 2, 3277 (1964) discloses methods for producing a cyclohexadiene homopolymer, in which the polymerization of 1,3-cyclohexadiene is conducted by various polymerization methods, such as radical polymerization, cationic polymerization, anionic polymerization and coordination polymerization.

However, in all of the methods disclosed in this prior art document, the polymers obtained have an extremely low molecular weight. Therefore, the polymers obtained by the techniques of this prior art document are of no commercial value. Further, this prior art document has no teaching or suggestion of a method for introducing a cyclic olefin monomer unit into the polymeric molecular chain of a polymer as well as modification of a polymer containing a cyclic olefin monomer unit.

British Patent Application No. 1,042,625 discloses a method for producing a cyclohexadiene homopolymer, in which the polymerization of 1,3-cyclohexadiene is conducted using a large amount of an organolithium compound as a catalyst.

In the polymerization method disclosed in British Patent Application No. 1,042,625, the catalyst must be used in an amount as large as 1 to 2 wt %, based on the total weight of the monomers. Therefore, this method is economically disadvantageous. Further, the polymer obtained by this method has only an extremely low molecular weight.

Moreover, the method of this prior art document has disadvantages in that the polymer obtained contains a large amount of catalyst residue, which is very difficult to remove from the polymer, so that the polymer obtained by this method is of no commercial value.

Furthermore, this prior art document has no teaching or suggestion of a method for introducing a cyclic olefin monomer unit into the main molecular chain of a polymer as well as modification of a polymer containing a cyclic olefin monomer unit.

J. Polym. Sci., Pt. A, 3, 1553 (1965) discloses a cyclohexadiene homopolymer, which is obtained by polymerizing 1,3-cyclohexadiene using an organolithium compound as a catalyst. In this prior art document, the polymerization reaction must be continued for a period as long as 5 weeks, however, the polymer obtained has a number average molecular weight of only 20,000 or less.

Further, this prior art document has no teaching or suggestion of a method for introducing a cyclic olefin monomer unit into the main molecular chain of a polymer as well as modification of a polymer containing a cyclic olefin monomer unit.

Polym. Prepr. (Amer. Chem. Soc., Div. Polym. Chem.) 12, 402 (1971) teaches that when the polymerization of 1,3-cyclohexadiene is conducted using an organolithium compound as a catalyst, the upper limit of the number average molecular weight of the cyclohexadiene homopolymer obtained is only from 10,000 to 15,000. Further, this document teaches that the reason for such a small molecular weight resides in that, concurrently with the polymerization reaction, not only does a transfer reaction occur, which is caused by the abstraction of a lithium cation present in the polymer terminal, but also a lithium hydride elimination reaction occurs.

Furthermore, this prior art document has no teaching or suggestion of a method for introducing a cyclic olefin monomer unit into the main molecular chain of a polymer as well as modification of a polymer containing a cyclic olefin monomer unit.

Die Makromolekulare Chemie., 163, 13 (1973) discloses a cyclohexadiene homopolymer which is obtained by polymerizing 1,3-cyclohexadiene using a large amount of an organolithium compound as a catalyst. However, the polymer obtained in this prior art document is an oligomer having a number average molecular weight of only 6,500.

Further, this prior art document has no teaching or suggestion of a method for introducing a cyclic olefin monomer unit into the main molecular chain of a polymer as well as modification of a polymer containing a cyclic olefin monomer unit.

European Polymer J., 9, 895 (1973) discloses a copolymer which is obtained by copolymerizing 1,3-cyclohexadiene with butadiene and/or isoprene, using a $\pi$-allylnickel compound as a polymerization catalyst.

However, the polymer obtained in this prior art document is an oligomer having an extremely low molecular weight. Further, it has been reported that the polymer of this prior art document has a single glass transition temperature, which suggests that the polymer has a random copolymer structure.

Further, this prior art document has no teaching or suggestion of a method for introducing a cyclic olefin monomer unit into the main molecular chain of a polymer as well as modification of a polymer containing a cyclic olefin monomer unit.

Kobunshi Ronbun-shu (Collection of theses concerning polymers), Vol. 34, No. 5, 333 (1977) discloses a method for synthesizing an alternating copolymer of 1,3-cyclohexadiene and acrylonitrile using zinc chloride as a polymerization catalyst. However, the alternating copolymer obtained in this prior art document is an oligomer having an extremely low molecular weight.

Further, this prior art document has no teaching or suggestion of a method for introducing a cyclic olefin monomer unit into the main molecular chain of a polymer as well as modification of a polymer containing a cyclic olefin monomer unit.

J. Polym. Sci., Polym. Chem. Ed., 20, 901 (1982) discloses a cyclohexadiene homopolymer which is obtained by polymerizing 1,3-cyclohexadiene using an organosodium compound as a catalyst. In this prior art document, the organosodium compound used is sodium naphthalene, and a radical anion derived from sodium naphthalene forms a dianion which functions as a polymerization initiation site.

This means that although the cyclohexadiene homopolymer reported in this document has an apparent number average molecular weight of 38,700, this homopolymer is actually only a combination of two polymeric molecular chains, each having a number average molecular weight of 19,350, which chains respectively extend from the polymerization initiation site in two different directions.

Further, in the polymerization method disclosed in this document, the polymerization reaction needs to be conducted at an extremely low temperature. Therefore, the technique of this prior art document is of no commercial value.

Furthermore, this prior art document has no teaching or suggestion of a method for introducing a cyclic olefin monomer unit into the main molecular chain of a polymer as well as modification of a polymer containing a cyclic olefin monomer unit.

Makromol. Chem., 191, 2743 (1990) discloses a method for polymerizing 1,3-cyclohexadiene using a polystyryllithium as a polymerization initiator. In this prior art document, it is described that concurrently with the polymerization reaction, not only a transfer reaction, which is caused by the abstraction of a lithium cation present in the polymer terminal, but also a lithium hydride elimination reaction vigorously occurs. Further, it is reported that even though the polymerization is conducted using a polystyryllithium as a polymerization initiator, a styrene-cyclohexadiene block copolymer cannot be obtained at room temperature, but the product obtained is only a cyclohexadiene homopolymer having a low molecular weight.

Further, neither a block copolymer of cyclohexadiene and a chain conjugated diene monomer, nor a multiblock copolymer which is an at least-tri-block copolymer containing a cyclohexadiene polymer block, nor a radial block copolymer containing cyclohexadiene polymer block is taught or suggested in this prior art document.

Furthermore, this prior art document has no teaching or suggestion of a method for introducing a cyclic olefin monomer unit into the main molecular chain of a polymer as well as modification of a polymer containing a cyclic olefin monomer unit.

As can be easily understood from the above, in any of the conventional techniques, it has been impossible to obtain a modified cyclic conjugated diene monomer unit-containing polymer which can be satisfactorily used as an industrial material.

SUMMARY OF THE INVENTION

In these situations, the present inventors previously made extensive and intensive studies with a view toward developing a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, which other monomer is copolymerizable with the cyclic conjugated diene monomer, and wherein the cyclic conjugated diene polymer has a high number average molecular weight, so that it has not only excellent thermal properties in respect of, for example, a melting temperature, a glass transition temperature and a heat distortion temperature, but also excellent mechanical properties, such as high tensile modulus and high flexural modulus, and a method for producing such an excellent cyclic conjugated diene polymer. As a result, the present inventors successfully developed a novel polymerization catalyst useful for production of such a polymer as mentioned above, which catalyst has an excellent catalytic activity for not only achieving a desired high polymerization degree, but also effectively and efficiently performing a living anionic polymerization which enables block copolymerization of a cyclic conjugated diene monomer and at least one type of comonomer which is copolymerizable with the cyclic conjugated diene monomer. With such a novel polymerization catalyst, it has for the first time become possible to synthesize a novel cyclic conjugated diene polymer, which has never been reported. In addition, a technique to obtain a cyclic conjugated diene polymer, in which monomer units derived from cyclic conjugated diene monomers are introduced, in a desired proportion and in a desired configuration, as a part or all of monomer units constituting a main chain of the polymer, has been developed (see PCT/JP94/00822). In addition, the present inventors have made further studies and, as a result, have developed a technique to produce a polymer containing a saturated cyclic monomer unit, which polymer is derived from the above-mentioned cyclic conjugated diene polymer (see PCT/JP94/00973).

The present inventors have made still further studies. As a result, the present inventors have found that, by subjecting the above-mentioned cyclic conjugated diene polymer or a cyclic olefin monomer unit-containing polymer (which is obtained by saturating a part or all of the carbon-carbon double bonds of the above-mentioned cyclic conjugated diene polymer) to modification with a functional group or an organic compound residue containing the functional group (wherein the functional group contains at least one member selected from the group consisting of oxygen, nitrogen, sulfur, silicon, phosphorus and halogen, including fluorine, chlorine, bromine and iodine), a modified cyclic monomer unit-containing polymer having excellent mechanical properties which are unlikely to suffer an unfavorable change at ambient temperatures can be obtained. The present invention has been completed, based on these novel findings.

Accordingly, it is an object of the present invention to provide a novel polymer containing a modified cyclic monomer unit, which polymer is obtained by subjecting a cyclic conjugated diene polymer or a cyclic olefin monomer unit-containing polymer (which is obtained by saturating a part or all of the carbon-carbon double bonds of the cyclic conjugated diene polymer) to modification with a specific functional group or an organic compound residue containing the functional group, wherein the novel polymer not only has excellent mechanical properties which are not susceptive to an unfavorable change at ambient temperatures, but also has advantages such that, for example, when the polymer is combined with other polymers to provide composite resin materials, the resultant composite resin materials are imparted with stable and excellent mechanical properties.

It is another object of the present invention to provide an effective and efficient method for producing such a novel modified cyclic monomer unit-containing polymer as mentioned above.

The foregoing and other objects, features and advantages of the present invention will be apparent from the following detailed description and claims, taken in connection with the accompanying drawings.

DETAILED DESCRIPTION OF THE INVENTION

Figure 1:
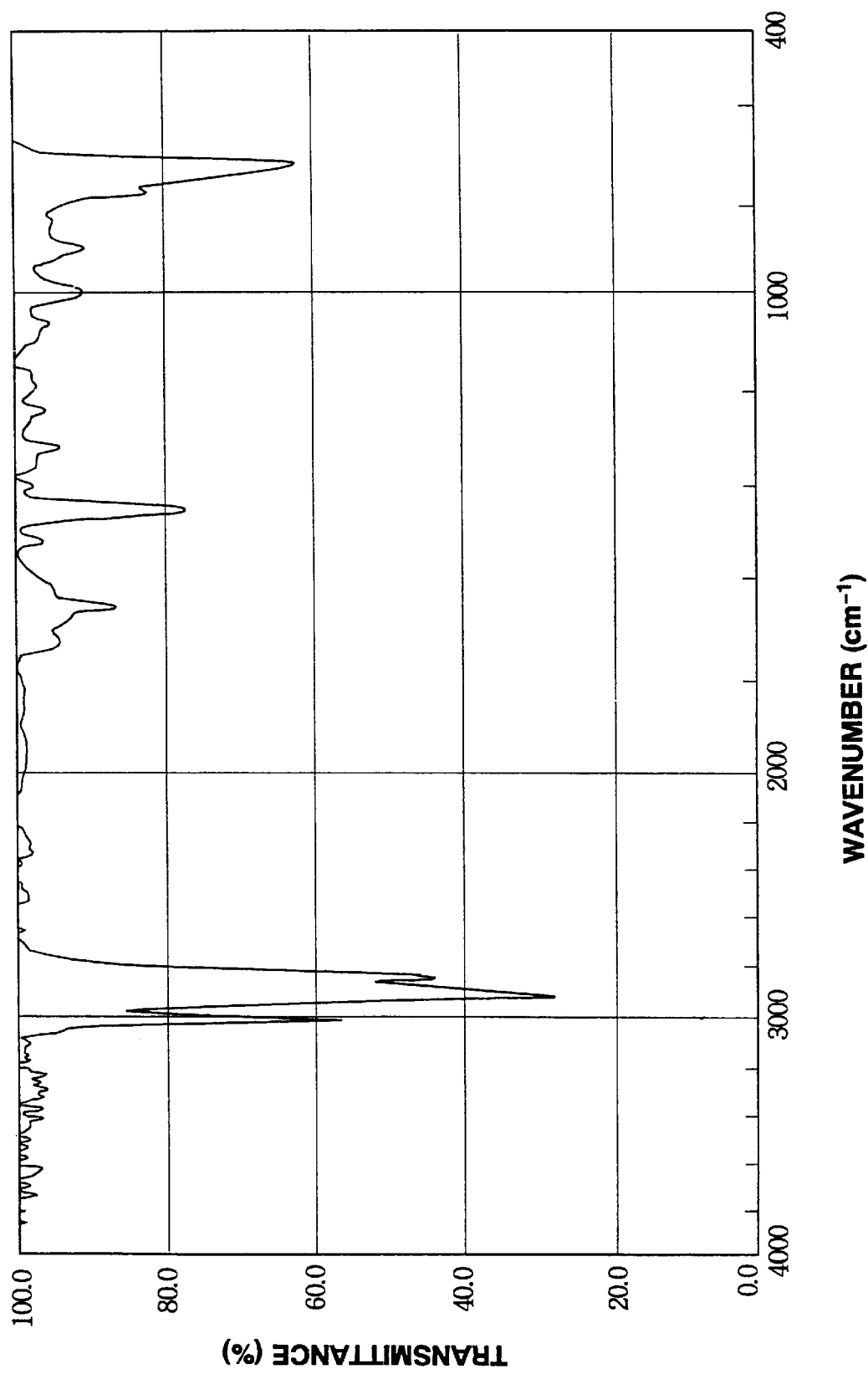
FIG. 1 is a chart showing the infrared absorption spectrum of the cyclic conjugated diene homopolymer, obtained in Reference Example 1.

In one aspect of the present invention, there is provided a polymer containing a modified cyclic monomer unit, comprising a polymer chain represented by the following formula (I):

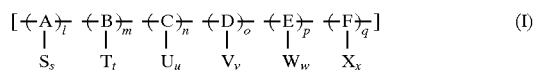

wherein A to F are monomer units constituting a main chain of the polymer chain, in which monomer units A to F are arranged in any order, and l to q are, respectively, weight percentages of monomer units A to F, based on the total weight of monomer units A to F;
wherein:
  each A is independently selected from the group consisting of cyclic olefin monomer units,
  each B is independently selected from the group consisting of cyclic conjugated diene monomer units,
  each C is independently selected from the group consisting of chain conjugated diene monomer units,
  each D is independently selected from the group consisting of vinyl aromatic monomer units,
  each E is independently selected from the group consisting of polar monomer units, and
  each F is independently selected from the group consisting of an ethylene monomer unit and α-olefin monomer units;
wherein:
  l to q satisfy the following requirements:

$l+m+n+o+p+q=100$, $0 \leq l, m \leq 100$, $0 \leq n, o, p, q \leq 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and
wherein s to x are, respectively, weight percentages of the modifying groups S to X, based on the weight of the polymer, and satisfy the following requirements:

$0 < s+t+u+v+w+x < 100$, and $0 \leq s, t, u, v, w, x < 100$, the polymer having a number average molecular weight of from 10,000 to 5,000,000.

In another aspect of the present invention, there is provided a method for producing a polymer containing a modified cyclic monomer unit, comprising a polymer chain represented by the following formula (I):

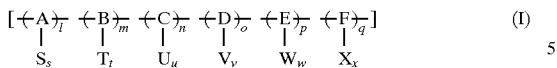
(I)

wherein A to F are monomer units constituting a main chain of the polymer chain, in which monomer units A to F are arranged in any order, and l to q are, respectively, weight percentages of monomer units A to F, based on the total weight of monomer units A to F;
wherein:
  each A is independently selected from the group consisting of cyclic olefin monomer units,
  each B is independently selected from the group consisting of cyclic conjugated diene monomer units,
  each C is independently selected from the group consisting of chain conjugated diene monomer units,
  each D is independently selected from the group consisting of vinyl aromatic monomer units,
  each E is independently selected from the group consisting of polar monomer units, and
  each F is independently selected from the group consisting of an ethylene monomer unit and α-olefin monomer units;
wherein:
  l to q satisfy the following requirements:

$l+m+n+o+p+q=100$, $0 \leq l, m \leq 100$, $0 \leq n, o, p, q < 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and
wherein s to x are, respectively, weight percentages of the modifying groups S to X, based on the weight of the polymer, and satisfy the following requirements:

$0 < s+t+u+v+w+x < 100$, and $0 \leq s, t, u, v, w, x < 100$, which comprises reacting a cyclic monomer unit-containing polymer comprising a main chain represented by the following formula (I'):

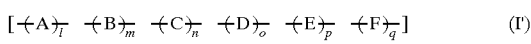
(I')

wherein A to F are monomer units constituting the main chain in which monomer units A to F are arranged in any order, and l to q are, respectively, weight percentages of monomer units A to F, based on the total weight of monomer units A to F;
wherein:
  each A is independently selected from the group consisting of cyclic olefin monomer units, each B is independently selected from the group consisting of cyclic conjugated diene monomer units,
  each C is independently selected from the group consisting of chain conjugated diene monomer units,
  each D is independently selected from the group consisting of vinyl aromatic monomer units,
  each E is independently selected from the group consisting of polar monomer units, and
  each F is independently selected from the group consisting of an ethylene monomer unit and α-olefin monomer units;
wherein:
  l to q satisfy the following requirements:

$l+m+n+o+p+q=100$, $0 \leq l, m \leq 100$, $0 \leq n, o, p, q < 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and
wherein s to x are, respectively, weight percentages of the modifying groups S to X, based on the weight of the polymer, and satisfy the following requirements:

$0 < s+t+u+v+w+x < 100$, and $0 \leq s, t, u, v, w, x < 100$, with a reactive reagent containing at least one modifying group selected from the group consisting of a functional group and an organic compound residue containing the functional group, with the functional group containing at least one member selected from the group consisting of oxygen, nitrogen, sulfur, silicon, phosphorus and halogen, including fluorine, chlorine, bromine and iodine, thereby bonding the at least one modifying group to the cyclic monomer unit-containing polymer by an addition reaction.

For an easy understanding of the present invention, the essential features and various embodiments of the present invention are enumerated below.

1. A polymer containing a modified cyclic monomer unit, comprising a polymer chain represented by the following formula (I):

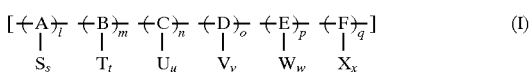
(I)

wherein A to F are monomer units constituting a main chain of the polymer chain, in which monomer units A to F are arranged in any order, and l to q are, respectively, weight percentages of monomer units A to F, based on the total weight of monomer units A to F;
wherein:
  each A is independently selected from the group consisting of cyclic olefin monomer units,
  each B is independently selected from the group consisting of cyclic conjugated diene monomer units, each C is independently selected from the group consisting of chain conjugated diene monomer units, each D is independently selected from the group consisting of vinyl aromatic monomer units, each E is independently selected from the group consisting of polar monomer units, and each F is independently selected from the group consisting of an ethylene monomer unit and α-olefin monomer units;

wherein:

l to q satisfy the following requirements:

$l+m+n+o+p+q=100$, $0 \leq l, m \leq 100$, $0 \leq n, o, p, q < 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and wherein s to x are, respectively, weight percentages of the modifying groups S to X, based on the weight of the polymer, and satisfy the following requirements:

$0 < s+t+u+v+w+x < 100$, and $0 < s, t, u, v, w, x < 100$, the polymer having a number average molecular weight of from 10,000 to 5,000,000.

2. The polymer according to item 1 above, wherein l=100.

3. The polymer according to item 1 above, wherein m=100.

4. The polymer according to item 1 above, wherein l+m=100 and l>0.

5. The polymer according to item 1 above, wherein 0<l+m<100.

6. The polymer according to item 1 above, wherein the main chain has a random copolymer configuration.

7. The polymer according to item 1 above, wherein the main chain has an alternating copolymer configuration.

8. The polymer according to item 1 above, wherein the main chain has a block copolymer configuration, in which the block copolymer has at least one polymer block containing at least one monomer unit selected from the group consisting of the A monomer unit and the B monomer unit.

9. The polymer according to item 1 above, wherein the main chain has a block copolymer configuration, in which the block copolymer has at least one polymer block consisting of at least one A monomer unit and at least one B monomer unit.

10. The polymer according to item 1 above, wherein the main chain has a block copolymer configuration, in which the block copolymer has at least one polymer block consisting of A monomer units.

11. The polymer according to item 1 above, wherein the main chain has a block copolymer configuration, in which the block copolymer has at least one polymer block consisting of B monomer units.

12. The polymer according to any one of items 1 to 11 above, wherein the A monomer unit is selected from the group consisting of cyclic olefin monomer units represented by the following formula (II):

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or 5 a group such that two $R^2$ groups together form a bridge represented by the formula $-(CR_2^3)_y-$ in which $R^3$ has the same meaning as defined for $R^1$ and y is an integer of from 1 to 10, and wherein the B monomer unit is selected from the group consisting of cyclic conjugated diene monomer units represented by the following formula (III):

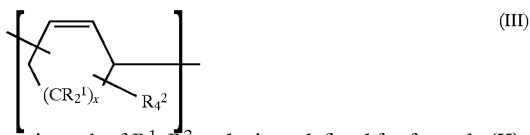

wherein each of $R^1$, $R^2$ and x is as defined for formula (II).

13. The polymer according to item 12 above, wherein the A monomer unit is selected from the group consisting of cyclic olefin monomer units represented by the following formula (IV):

wherein each $R^2$ is as defined for formula (II), and wherein the B monomer unit is selected from the group consisting of cyclic conjugated diene monomer units represented by the following formula (V):

wherein each $R^2$ is as defined for formula (II).

14. The polymer according to any one of items 1 to 13 above, wherein each of S to X is independently a functional group or an organic compound residue containing the functional group, with the functional group being at least one member selected from the group consisting of a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido group, an amidine group, a nitrile group, a nitro group, an isocyano group, a cyanato group, an isocyanato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehydo group, a thioketone group, a phosphoric acid group, a phosphonic acid group and a phosphinic acid group.

15. The polymer according to any one of items 1 to 13 above, wherein each of S to X is independently a functional group or an organic compound residue containing the functional group, with the functional group being at least one member selected from the group consisting of a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group.

16. A method for producing a polymer containing a modified cyclic monomer unit, comprising a polymer chain represented by the following formula (I):

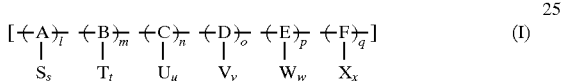

wherein A to F are monomer units constituting a main chain of the polymer chain, in which monomer units A to F are arranged in any order, and l to q are, respectively, weight percentages of monomer units A to F, based on the total weight of monomer units A to F;
wherein:
each A is independently selected from the group consisting of cyclic olefin monomer units,
each B is independently selected from the group consisting of cyclic conjugated diene monomer units,
each C is independently selected from the group consisting of chain conjugated diene monomer units,
each D is independently selected from the group consisting of vinyl aromatic monomer units,
each E is independently selected from the group consisting of polar monomer units, and
each F is independently selected from the group consisting of an ethylene monomer unit and α-olefin monomer units;
wherein:
l to q satisfy the following requirements:

$l+m+n+o+p+q=100$, $0 \leq l, m \leq 100$, $0 \leq n, o, p, q < 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and
wherein s to x are, respectively, weight percentages of the modifying groups S to X, based on the weight of the polymer, and satisfy the following requirements:

$0 < s+t+u+v+w+x < 100$, and $0 \leq s, t, u, v, w, x < 100$, which comprises reacting a cyclic monomer unit-containing polymer comprising a main chain represented by the following formula (I'):

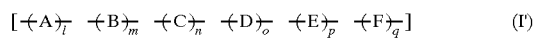

wherein A to F are monomer units constituting the main chain in which monomer units A to F are arranged in any order, and l to q are, respectively, weight percentages of monomer units A to F, based on the total weight of monomer units A to F;
wherein:
each A is independently selected from the group consisting of cyclic olefin monomer units,
each B is independently selected from the group consisting of cyclic conjugated diene monomer units,
each C is independently selected from the group consisting of chain conjugated diene monomer units,
each D is independently selected from the group consisting of vinyl aromatic monomer units,
each E is independently selected from the group consisting of polar monomer units, and
each F is independently selected from the group consisting of an ethylene monomer unit and α-olefin monomer units;
wherein:
l to q satisfy the following requirements:

$l+m+n+o+p+q=100$, $0 \leq l, m \leq 100$, $0 \leq n, o, p, q < 100$, and $l+m \neq 0$;

wherein each of S to X, which are modifying groups and which are the same or different, is independently a functional group or an organic compound residue containing the functional group, with the functional group containing at least one member selected from the group consisting of oxygen, nitrogen, sulfur, silicon, phosphorus and halogen, including fluorine, chlorine, bromine and iodine; and
wherein s to x are, respectively, weight percentages of the modifying groups S to X, based on the weight of the polymer, and satisfy the following requirements:

$0 < s+t+u+v+w+x < 100$, and $0 \leq s, t, u, v, w, x < 100$, with a reactive reagent containing at least one modifying group selected from the group consisting of a functional group and an organic compound residue containing the functional group, with the functional group containing at least one member selected from the group consisting of oxygen, nitrogen, sulfur, silicon, phosphorus and halogen, including fluorine, chlorine, bromine and iodine, thereby bonding the at least one modifying group to the cyclic monomer unit-containing polymer by an addition reaction.

17. The method according to item 16 above, wherein the reactive reagent comprises at least one compound selected from the group consisting of i) an unsaturated carboxylic acid or a derivative thereof, ii) an epoxy compound and iii) an organic silicon compound.

In the present invention, the monomer units of the polymer are named in accordance with a nomenclature such that the names of the original monomers from which the monomer units are derived, as such, are used with the term "unit" being attached thereto. For example, the term "cyclic olefin monomer unit" means a monomer unit which is formed in a polymer obtained by the polymerization of a cyclic olefin monomer and which has a molecular structure such that a cycloalkane corresponding to the cyclic olefin monomer is bonded at two carbon atoms of a skeleton thereof. Further, the term "cyclic conjugated diene monomer unit" means a monomer unit which is formed in a polymer obtained by the polymerization of a cyclic conjugated diene monomer and which has a molecular structure such that a cycloolefin corresponding to the cyclic conjugated diene monomer is bonded at two carbon atoms of a skeleton thereof.

In the present invention, the polymer containing a modified cyclic monomer unit is a polymer which comprises a polymer chain which is comprised partly or entirely of a cyclic olefin monomer unit and/or a cyclic conjugated diene monomer unit, and which polymer chain is represented by the following formula (I):

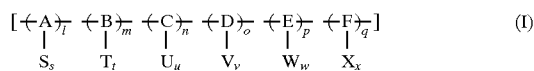

wherein A to F, l to q, S to X and s to x are as defined above.

In the present invention, with respect to each of monomer units A to F in the formula (I) or (I'), when a plurality of monomer units are contained in a main chain of the polymer chain, the monomer units may be the same or different.

In the present invention, it is preferred that the modified cyclic monomer unit-containing polymer be a polymer comprising a main chain which is comprised partly or entirely of 5 to 8-membered cyclic olefin monomer units and/or 5 to 8-membered cyclic conjugated diene monomer units, wherein the monomer units are bonded by a 1,2-bond and/or a 1,4-bond.

In the present invention, it is preferred that the modified cyclic monomer unit-containing polymer have a ratio of the 1,2-bond to the 1,4-bond of from 99/1 to 1/99, more preferably from 90/10 to 10/90.

In the present invention, the cyclic olefin monomer unit is at least one member selected from cyclic olefin monomer units having a carbocyclic structure. It is preferred that the cyclic olefin monomer unit be at least one member selected from cyclic olefin monomer units having a 5 to 8-membered carbocyclic structure. It is especially preferred that the cyclic olefin monomer unit be at least one member selected from cyclic olefin monomer units having a 6-membered carbocyclic structure.

Examples of cyclic olefin monomer units include cyclopentane, cyclohexane, cyclooctane and derivatives thereof. Of these, cyclohexane and derivatives thereof are especially preferred.

It is preferred that the cyclic olefin monomer unit be a molecular unit represented by the following formula (II):

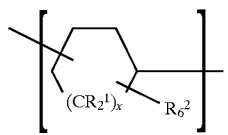

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group, or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y-$ in which $R^3$ has the same meaning as defined for $R^1$ and y is an integer of from 1 to 10.

It is most preferred that the cyclic olefin monomer unit be a molecular unit represented by the following formula (IV):

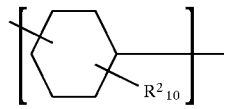

wherein each $R^2$ is as defined for formula (II).

In the present invention, the modified cyclic conjugated diene monomer unit is at least one member selected from cyclic conjugated diene monomer units having a carbocyclic structure. It is preferred that the cyclic conjugated diene monomer unit be at least one member selected from cyclic conjugated diene monomer units having a 5 to 8-membered carbocyclic structure. It is especially preferred that the cyclic conjugated diene monomer unit be at least one member selected from cyclic conjugated diene monomer units having a 6-membered carbocyclic structure.

Examples of cyclic conjugated diene monomer units include cyclopentene, cyclohexene, cyclooctene and derivatives thereof. Of these, cyclohexene and derivatives thereof are especially preferred.

It is more preferred that the cyclic conjugated diene monomer unit be a monomer unit represented by the following formula (III):

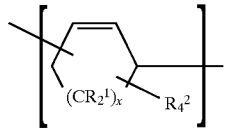

wherein each $R^1$, $R^2$ and x is as defined for formula (II).

It is most preferred that the cyclic conjugated diene monomer unit be a monomer unit represented by the following formula (V):

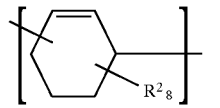

wherein each $R^2$ is as defined for formula (II).

In the modified cyclic monomer unit-containing polymer of the present invention, there is no particular limitation with respect to the total of the content (l) of the cyclic olefin monomer unit and the content (m) of the cyclic conjugated diene monomer unit, and the total content (l+m) may vary, depending on the intended use of the polymer, as long as l and m satisfy the relationship: 0<l+m≦100. However, the total content (l+m) is generally within the range of from 0.001 to 100 wt %, preferably from 0.01 to 100 wt %, more preferably from 0.1 to 100 wt %.

Further, for obtaining a modified cyclic monomer unit-containing polymer of the present invention which can be used in a field where the polymer is required to have high thermal and mechanical properties, it is recommended that the content (l) of the cyclic olefin monomer unit in the polymer be within the range of from 1 to 100 wt %, more preferably from 2 to 100 wt %, most preferably from 5 to 100 wt %, based on the total weight of the monomer units A to F of the polymer.

There is no particular limitation with respect to a method for producing the polymer of the present invention, as long as the polymer contains a cyclic olefin monomer unit and/or a cyclic conjugated diene monomer unit, and has a number average molecular weight falling within the range specified in the present invention.

Further, in the present invention, there is no particular limitation with respect to a method for forming a polymeric molecular chain containing a cyclic olefin monomer unit.

Examples of such methods include a method which comprises polymerizing a cyclic conjugated diene monomer to thereby obtain a cyclic conjugated diene homopolymer, and subjecting the obtained cyclic conjugated diene homopolymer to an addition reaction, wherein the addition reaction, such as a hydrogenation, is performed at a carbon-to-carbon double bond or bonds in a part or all of the cyclic conjugated diene monomer units contained in the cyclic conjugated diene homopolymer, to thereby convert the cyclic conjugated diene monomer unit to the cyclic olefin monomer unit; a method which comprises polymerizing a cyclic conjugated diene monomer with a comonomer copolymerizable therewith to thereby obtain a cyclic conjugated diene copolymer, and subjecting the obtained cyclic conjugated diene copolymer to an addition reaction, wherein the addition reaction is performed at a carbon-to-carbon double bond or bonds in a part or all of the cyclic conjugated diene monomer units contained in the cyclic conjugated diene copolymer, to thereby convert the cyclic conjugated diene monomer unit to the cyclic olefin monomer unit; a method which comprises polymerizing a cyclic olefin monomer with a comonomer, to thereby obtain a copolymer containing a cyclic olefin monomer unit; a method which comprises polymerizing a cyclic olefin monomer to thereby obtain a homopolymer containing a cyclic olefin monomer unit; and a method which comprises polymerizing a cyclic conjugated diene monomer with a cyclic olefin monomer, to thereby obtain a copolymer containing a cyclic olefin monomer unit. From these methods, a preferable method can be appropriately selected depending on the situation involved.

When the modified cyclic monomer unit-containing polymer (hereinafter, frequently referred to as "modified polymer") of the present invention is obtained by modifying a cyclic olefin monomer unit-containing polymer, which is obtained by homopolymerizing or copolymerizing a cyclic conjugated diene monomer to obtain a cyclic conjugated diene polymer, followed by hydrogenation, the degree of hydrogenation, which is defined as the ratio (mole %) of hydrogenation of the carbon-to-carbon double bonds contained in the cyclic conjugated diene monomer units in the cyclic conjugated diene polymer, is not particularly limited and may vary depending on the amount of cyclic olefin monomer unit required for the modified polymer in accordance with the intended use thereof. However, the degree of hydrogenation is generally within the range of from 1 to 100 mole %, preferably from 5 to 100 mole %, more preferably from 10 to 100 mole %, especially preferably from 20 to 100 mole %.

Further, especially when the modified polymer of the present invention is for use in fields where the polymer is required to have high thermal and mechanical properties, it is recommended that the degree of hydrogenation be within the range of from 50 to 100 mole %, more preferably from 70 to 100 mole %, most preferably not less than 90 mole %.

The modified polymer of the present invention has a number average molecular weight within the range of from 10,000 to 5,000,000. From the viewpoint of productivity in the commercial scale production of such a polymer, it is recommended that the number average molecular weight of the polymer be within the range of from 15,000 to 5,000,000, preferably within the range of from 20,000 to 3,000,000, more preferably from 25,000 to 2,000,000, still more preferably from 30,000 to 1,000,000. The most preferred range is from 40,000 to 500,000.

When the number average molecular weight of such a modified polymer is less than 10,000, the polymer is likely to be a markedly brittle solid substance or a viscous liquid, so that the commercial value of the modified polymer as an industrial material becomes extremely low.

On the other hand, when the number average molecular weight of such a modified polymer is more than 5,000,000, the polymer is disadvantageous in various aspects from a commercial viewpoint. For example, a polymer having such a high molecular weight has disadvantages in that a prolonged period of time is needed for the polymerization reaction, and the melt viscosity of the polymer obtained becomes high.

When the modified polymer of the present invention is obtained by modifying a cyclic conjugated diene homopolymer, it is preferred that the number average molecular weight of the polymer be within the range of from 40,000 to 5,000,000. When the number average molecular weight of such a modified polymer is less than 40,000, the polymer is likely to become markedly brittle, so that the commercial value of the polymer as a structural material becomes extremely low.

From the viewpoint of productivity in the commercial scale production of such a modified polymer, the number average molecular weight of the polymer is preferably within the range of from 40,000 to 3,000,000, more preferably from 40,000 to 2,000,000, still more preferably from 40,000 to 1,000,000. The most preferred range is from 40,000 to 500,000.

When the modified polymer of the present invention is obtained by modifying a polymer comprised only of cyclic olefin monomer units or modifying a copolymer comprised of only at least one cyclic olefin monomer unit and at least one cyclic conjugated diene monomer unit, the number average molecular weight of the polymer is from 10,000 to 5,000,000.

From the viewpoint of productivity in the commercial scale production of such a modified polymer, the number average molecular weight of the polymer is preferably within the range of from 15,000 to 5,000,000, more preferably from 20,000 to 3,000,000, still more preferably from 25,000 to 2,000,000, further more preferably from 30,000 to 1,000,000. The most preferred range for the modified polymer for use as an industrial material is from 40,000 to 500,000.

When the number average molecular weight of such a modified polymer is less than 10,000, the polymer is likely to become a markedly brittle solid substance or a viscous liquid, so that the commercial value of the modified polymer as a structural material becomes extremely low.

On the other hand, when the number average molecular weight of such a modified polymer is more than 5,000,000, the polymer is disadvantageous in various aspects from the commercial viewpoint. For example, the modified polymer having such a high molecular weight has disadvantages in that a prolonged period of time is needed for the polymerization reaction, and that the melt viscosity of the polymer obtained becomes high.

When the modified polymer of the present invention is obtained by modifying a copolymer comprising at least one cyclic conjugated diene monomer unit and at least one monomer unit derived from a monomer copolymerizable with the cyclic conjugated diene monomer, the number average molecular weight of such a polymer is preferably within the range of from 25,000 to 5,000,000, more preferably 25,000 to 3,000,000, still more preferably from 25,000 to 2,000,000, further more preferably from 30,000 to 1,000,000. The most preferred range for the modified copolymer for use as an industrial material is from 40,000 to 500,000.

When the modified polymer of the present invention is obtained by modifying a copolymer comprising at least one cyclic olefin monomer unit and at least one monomer unit derived from a monomer copolymerizable with the cyclic olefin monomer, the number average molecular weight is within the range of 10,000 to 5,000,000. From the viewpoint of productivity in the commercial scale production of such a modified copolymer, the number average molecular weight of the copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the copolymer for use as an industrial material is from 40,000 to 500,000.

When the number average molecular weight of such a modified copolymer is less than 10,000, the copolymer is likely to be a markedly brittle solid substance or a viscous liquid, so that the commercial value of the copolymer as an industrial material becomes low.

On the other hand, when the number average molecular weight of such a modified copolymer is more than 5,000,000, the copolymer is disadvantageous in various aspects from a commercial viewpoint. For example, a modified copolymer having such a high molecular weight has disadvantages in that a prolonged period of time is needed for the polymerization reaction, and the melt viscosity of the copolymer obtained becomes high.

When the modified polymer of the present invention is a copolymer comprised of at least one cyclic olefin monomer unit, at least one cyclic conjugated diene monomer unit, and at least one monomer unit derived from a monomer copolymerizable with the cyclic olefin monomer and/or the cyclic conjugated diene monomer, the number average molecular weight is within the range of from 10,000 to 5,000,000.

From the viewpoint of productivity in the commercial scale production of such a modified copolymer, the number average molecular weight of the copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the modified copolymer for use as an industrial material is from 40,000 to 500,000.

When the number average molecular weight of such a modified copolymer is less than 10,000, the copolymer is likely to be a markedly brittle solid substance or a viscous liquid, so that the commercial value of the modified copolymer as an industrial material becomes extremely low.

On the other hand, when the number average molecular weight of such a modified copolymer is more than 5,000,000, the copolymer is disadvantageous in various aspects from a commercial viewpoint. For example, a modified copolymer having such a high molecular weight has disadvantages in that a prolonged period of time is needed for the polymerization reaction, and the melt viscosity of the copolymer obtained becomes high.

When the modified polymer of the present invention is obtained by modifying a block copolymer having at least one polymer block containing at least one monomer unit selected from the group consisting of a cyclic olefin monomer unit and a cyclic conjugated diene monomer unit, and optionally at least one monomer unit derived from a monomer copolymerizable with the cyclic olefin monomer and/or the cyclic conjugated diene monomer, it is preferred that the block copolymer be an at least-tri-block copolymer. The number average molecular weight of such a modified block copolymer is within the range of from 10,000 to 5,000,000. From the viewpoint of productivity in the commercial scale production of such a modified block copolymer, the number average molecular weight of the block copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the modified block copolymer for use as an industrial material is from 40,000 to 500,000.

When the number average molecular weight of such a modified block copolymer is less than 10,000, the block copolymer is likely to be a markedly brittle solid substance or a viscous liquid, so that the commercial value of the block copolymer as an industrial material becomes low.

On the other hand, when the number average molecular weight of such a modified block copolymer is more than 5,000,000, the block copolymer is disadvantageous in various aspects from a commercial viewpoint. For example, a block copolymer having such a high molecular weight has disadvantages in that a prolonged period of time is needed for the polymerization reaction, and the melt viscosity of the block polymer obtained becomes high.

In the present invention, the number average molecular weight ($\overline{Mn}$) and the weight average molecular weight ($\overline{Mw}$) are measured by gel permeation chromatography, using a calibration curve obtained with respect to standard polystyrene samples.

The $\overline{Mw}/\overline{Mn}$ value (a criterion for the molecular weight distribution) of the polymer is within the range of from 1.01 to 10, preferably from 1.03 to 7.0, more preferably from 1.05 to 5.0.

Preferred examples of modified polymers of the present invention include those which are obtained by individually hydrogenating polymers, such as a homopolymer of a cyclic conjugated diene monomer, a copolymer of at least two different types of cyclic conjugated diene monomers, and a copolymer of a cyclic conjugated diene monomer and a monomer copolymerizable with the cyclic conjugated diene monomer, wherein the hydrogenation is performed at a carbon-to-carbon double bond or bonds of a part or all of the cyclic conjugated diene monomer units to convert a part or all of the cyclic conjugated diene monomer units into cyclic olefin monomer units and subsequently, modifying the resultant hydrogenated polymers with a reactive reagent, so that a functional group or a functional group-containing organic compound residue is bonded to such hydrogenated polymers.

The modified polymer (modified cyclic monomer unit-containing polymer) of the present invention will be explained hereinbelow in more detail.

The modified polymer of the present invention comprises a polymer having a main chain which is comprised partly or entirely of at least one type of monomer unit selected from the group consisting of cyclic olefin monomer units and cyclic conjugated diene monomer units.

Representative examples of modified polymers of the present invention include those which are obtained by individually modifying polymers having monomer units derived solely from a cyclic conjugated diene monomer, and polymers having monomer units derived from a cyclic conjugated diene monomer and from a monomer copolymerizable with the cyclic conjugated diene monomer, and individually modifying hydrogenation products of these polymers.

Illustratively stated, the modified polymers of the present invention can be obtained by individually modifying homopolymers produced by polymerizing a single type of cyclic conjugated diene monomer, and copolymers produced by copolymerizing a cyclic conjugated diene monomer and a monomer copolymerizable with the cyclic conjugated diene monomer, or obtained by individually modifying hydrogenation products of the homopolymers and copolymers.

More specific examples of modified polymers of the present invention include those which are obtained by individually modifying a homopolymer of a single type of cyclic conjugated diene monomer, a copolymer of at least two different types of cyclic conjugated diene monomers, and a copolymer of a cyclic conjugated diene monomer and a monomer copolymerizable with the cyclic conjugated diene monomer, or obtained by individually modifying hydrogenation products of the homopolymers and copolymers.

The cyclic conjugated diene monomer in the present invention preferably has an at-least-5-membered carbocyclic ring structure.

It is more preferred that the cyclic conjugated diene monomer in the present invention have a 5 to 8-membered carbocyclic ring structure, preferably a 6-membered carbocyclic ring structure.

That is, preferred examples of modified polymers (modified cyclic monomer unit-containing polymers) of the present invention include those which have a main chain comprised partly or entirely of at least one type of monomer unit selected from the group consisting of cyclic olefin monomer units and cyclic conjugated diene monomer units, wherein the cyclic olefin monomer unit has a cyclohexane ring and the cyclic conjugated diene monomer unit has a cyclohexene ring.

Specific examples of cyclic conjugated diene monomers include 1,3-cyclopentadiene, 1,3-cyclohexadiene, 1,3-cyclooctadiene, and derivatives thereof. Preferred examples of cyclic conjugated diene monomers include 1,3-cyclohexadiene and 1,3-cyclohexadiene derivatives. Of these, 1,3-cyclohexadiene is most preferred.

In the present invention, examples of monomers copolymerizable with a cyclic conjugated diene monomer include known polymerizable monomers.

Examples of such copolymerizable monomers include chain conjugated diene monomers, such as 1,3-butadiene, isoprene, 2,3-dimethyl-1,3-butadiene, 1,3-pentadiene and 1,3-hexadiene; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, diphenylethylene and vinylpyridine; polar vinyl monomers, such as methyl methacrylate, methyl acrylate, acrylonitrile, methyl vinyl ketone and methyl α-cyanoacrylate; polar monomers, such as ethylene oxide, propylene oxide, lactone, lactam and cyclosiloxane; ethylene; and α-olefins. These monomers can be used individually or in combination.

When the modified polymer of the present invention is a copolymer, the copolymer may possess any configuration depending on the intended use of the copolymer.

For example, the copolymer may be a block copolymer, such as a diblock copolymer, a triblock copolymer, a tetrablock copolymer, a multiblock copolymer which is an at-least-penta block copolymer, and a radial block copolymer, a graft copolymer, a taper copolymer, a random copolymer or an alternating copolymer.

In the modified polymer of the present invention, the monomer unit derived from a comonomer copolymerizable with the cyclic olefin monomer or cyclic conjugated diene monomer may be a monomer unit which is formed by a post-polymerization treatment, such as hydrogenation or halogenation.

According to the most preferred mode of the method for producing the cyclic conjugated diene polymer to be used in the present invention, the polymer can be produced by living anionic polymerization, so that not only the molecular weight of the polymer but also the copolymer configuration can be freely designed.

With respect to the modified polymer of the present invention, for controlling the molecular weight of the polymer or for obtaining the polymer in the form of a star shaped polymer, a configuration can be assumed such that the terminals of a plurality of polymer chains are bonded together using a conventional at least-bi-functional coupling agent, such as dimethyl dichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester.

When the modified polymer of the present invention is a block copolymer, the block copolymer may contain various polymer blocks. Examples of polymer blocks contained in the block copolymer include a polymer block comprised of monomer units derived solely from at least one type of cyclic olefin monomer, a polymer block comprised of monomer units derived solely from at least one type of cyclic conjugated diene monomer, a polymer block comprised of monomer units derived from at least one type of cyclic olefin monomer and at least one type of conjugated diene monomer, a polymer block comprised of monomer units derived from at least one type of cyclic olefin monomer and at least one comonomer copolymerizable with the cyclic olefin monomer, a polymer block comprised of monomer units derived from at least one type of cyclic conjugated diene monomer and at least one comonomer copolymerizable with the cyclic conjugated diene monomer, a polymer block comprised of monomer units derived from at least one type of cyclic olefin monomer, at least one type of cyclic conjugate diene monomer and at least one comonomer copolymerizable with these monomers, and a polymer block comprised of monomer units derived solely from at least one comonomer copolymerizable with a cyclic conjugated diene monomer. For attaining various purposes, various types of polymer blocks can be designed and produced by polymerization. By appropriately choosing and bonding such polymer blocks, and modifying the resultant block copolymer, a modified cyclic monomer unit-containing block copolymer having suitable properties for the intended use can be obtained.

When a part or all of a polymer block in the modified polymer of the present invention is comprised of cyclic olefin monomer units, cyclic conjugated diene monomer units or both of these monomer units, it is recommended that the polymer block contain a contiguous arrangement of at least 10 such monomer units, preferably 20 or more such monomer units, more preferably 30 or more such monomer units, from the viewpoint of obtaining a block copolymer having excellent thermal and mechanical properties.

As the method of producing the modified cyclic monomer unit-containing block copolymer of the present invention, there can be mentioned, for example, a method which comprises: preparing various types of block unit polymers, namely, a block unit polymer comprised of monomer units derived solely from at least one type of cyclic conjugated diene monomer, a block unit polymer comprised of monomer units derived from at least one type of cyclic conjugated diene monomer and at least one comonomer copolymerizable with the cyclic conjugated diene monomer, and a block unit polymer comprised of monomer units derived solely from at least one comonomer copolymerizable with a cyclic conjugated diene monomer; choosing an appropriate combination of these block unit polymers; polymerization-bonding the combination of block unit polymers together; if desired, subjecting the resultant cyclic monomer unit-containing block copolymer to hydrogenation; and modifying the resultant block copolymer.

Specific examples of preferred modes of the method for producing the block copolymer include the following modes.

One mode of the method comprises the steps of forming by polymerization a block unit polymer containing a monomer unit derived from at least one type of cyclic conjugated diene monomer, or a block unit polymer derived solely from the cyclic conjugated diene monomer; polymerizing the block unit polymer with at least one type of comonomer copolymerizable with the cyclic conjugated diene monomer, wherein the comonomer is successively bonded to one or both terminals of the block unit polymer by polymerization; if desired, subjecting the block copolymer to hydrogenation; and modifying the resultant polymer.

Another mode of the method comprises the steps of polymerizing at least one type of comonomer copolymerizable with a cyclic conjugated diene monomer to obtain a block unit polymer; polymerizing the block unit polymer with at least one type of cyclic conjugated diene monomer, and optionally with at least one type of comonomer copolymerizable with the cyclic conjugated diene monomer, wherein the cyclic conjugated diene monomer and the optional comonomer are successively bonded to one or both terminals of the block unit polymer by polymerization; if desired, subjecting the block copolymer to hydrogenation; and modifying the resultant polymer.

A further mode of the method comprises the steps of forming by polymerization a block unit polymer containing a monomer unit derived from at least one type of cyclic conjugated diene monomer, or a block unit polymer comprised of monomer units derived solely from the cyclic conjugated diene monomer; polymerizing the block unit polymer with at least one type of comonomer copolymerizable with the cyclic conjugated diene monomer to obtain a polymer; successively bonding to the polymer by polymerization a block unit polymer containing a monomer unit derived from at least one cyclic conjugated diene monomer or a block unit polymer comprised of monomer units derived solely from the cyclic conjugated diene monomer; if desired, subjecting the block copolymer to hydrogenation; and modifying the resultant polymer.

Still a further mode of the method comprises the steps of polymerizing at least one type of comonomer copolymerizable with the cyclic conjugated diene monomer to obtain a block unit polymer; polymerizing the block unit polymer with a block unit polymer containing a monomer unit derived from at least one cyclic conjugated diene monomer or a block unit polymer comprised of monomer units derived solely from the cyclic conjugated diene polymer; successively bonding to the resultant polymer by polymerization at least one type of comonomer copolymerizable with the cyclic conjugated diene monomer; if desired, subjecting the block copolymer to hydrogenation; and modifying the resultant polymer.

Still a further mode of the method comprises the steps of forming by polymerization a block unit polymer containing a monomer unit derived from at least one cyclic conjugated diene monomer or a block unit polymer comprised of monomer units derived solely from the cyclic conjugated diene monomer; polymerizing the block unit polymer with at least one type of comonomer copolymerizable with the cyclic conjugated diene monomer to obtain a polymer; bonding the terminals of the molecular chain of the polymer together using a conventional at least-bi-functional coupling agent (such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester); if desired, subjecting the resultant block copolymer to hydrogenation; and modifying the resultant polymer.

Still a further mode of the method comprises the steps of forming by polymerization a block unit polymer containing a monomer unit derived from at least one cyclic conjugated diene monomer or a block unit polymer comprised of monomer units derived solely from the cyclic conjugated diene monomer; introducing a functional group to one or both terminals of the block unit polymer using a terminal modifier (ethylene oxide, propylene oxide, cyclohexene oxide, $CO_2$, acid chloride or the like), to obtain a functional block unit polymer; and, if desired, subjecting the obtained functional block unit polymer to hydrogenation.

Still a further mode of the method comprises steps of forming by polymerization a block unit polymer containing a monomer unit derived from at least one cyclic conjugated diene monomer or a block unit polymer comprised of monomer units derived solely from the cyclic conjugated diene monomer; polymerizing the block unit polymer with at least one type of comonomer copolymerizable with the cyclic conjugated diene monomer to obtain a polymer; introducing a functional group to one or both terminals of the thus obtained polymer using a terminal modifier (ethylene oxide, propylene oxide, cyclohexene oxide, $CO_2$, acid chloride or the like) to obtain a functional polymer; and, if desired, subjecting the functional polymer to hydrogenation.

Still a further mode of the method comprises polymerizing at least one type of cyclic conjugated diene monomer with at least one type of comonomer copolymerizable with the cyclic conjugated diene monomer, wherein the at least one comonomer has a different polymerization rate from that of the cyclic conjugated diene monomer, to thereby obtain a taper block copolymer; if desired, subjecting the obtained taper block copolymer to hydrogenation; and modifying the resultant polymer.

Still a further mode of the method comprises polymerizing a cyclic conjugated diene monomer and at least one type of comonomer copolymerizable with the cyclic conjugated diene monomer, wherein the ratio of the cyclic conjugated diene monomer to the at least one comonomer is not unity; if desired, subjecting block copolymer to hydrogenation; and modifying the resultant polymer.

Still a further mode of the method comprises the steps of forming by polymerization a block unit polymer comprised of monomer units derived from the cyclic conjugated diene monomer, wherein the polymerization is conducted until a desired certain conversion is achieved; polymerizing the block unit polymer with at least one type of comonomer, which is copolymerizable with and different in polymerization rate from the cyclic conjugated diene monomer, to thereby obtain a block copolymer; if desired, subjecting the resultant block copolymer to hydrogenation; and modifying the resultant polymer.

In the present invention, the block unit polymer comprised of at least one type of cyclic olefin monomer unit, at least one type of cyclic conjugated diene monomer unit, or both of such monomer units may further comprise a monomer unit derived from at least one comonomer copolymerizable with the cyclic conjugated diene monomer or the cyclic olefin monomer.

Further, in the present invention, the block unit polymer comprised of a monomer unit derived from at least one comonomer copolymerizable with the cyclic conjugated diene monomer may further comprise at least one type of monomer unit selected from the group consisting of cyclic olefin monomer units and cyclic conjugated diene monomer units.

In the present invention, with respect to polymer blocks comprising at least one type of a cyclic olefin monomer unit, it is most preferred to use a polymer block comprising or consisting of monomer units comprising a cyclohexane ring.

With respect to polymer blocks comprising a cyclic conjugated diene monomer unit, it is most preferred to use a polymer block comprising or consisting of monomer units comprising a cyclohexene ring.

In the present invention, for obtaining a modified cyclic conjugated diene block copolymer to be used as a thermoplastic elastomer or a special transparent resin having impact resistance, it is necessary that the block copolymer be comprised of at least two agglomeration phases (block units) and at least one elastomer phase (block unit), and that these two types of phases form a microdomain structure.

In the polymeric molecular chain of such a block copolymer, the agglomeration phase functions as a physical crosslinking site at a temperature lower than Tg, so that the block copolymer has elastomeric properties (rubber elasticity). On the other hand, at Tg or a temperature higher than Tg, the agglomeration phase becomes fluid, so that the block copolymer is imparted with flowability. Therefore, in this case, it becomes possible to perform an injection molding. Further, the block copolymer can be used as a recyclable material.

In the present invention, when employing the most preferred polymerization method, i.e., living anionic polymerization, it is possible to obtain a cyclic conjugated diene block copolymer comprising at least two block units (hereinafter frequently referred to as "X blocks") each comprised mainly of a cyclic conjugated diene monomer or a derivative thereof, or comprised of a cyclic conjugated diene monomer and a vinyl aromatic monomer, and at least one block unit (hereinafter frequently referred to as "Y block") comprised mainly of a chain conjugated diene monomer or a derivative thereof. Then, by subjecting the obtained block copolymer to a hydrogenation reaction and modifying the resultant copolymer, a modified block copolymer having a cyclic olefin monomer unit can be obtained.

For example, as the modified block copolymer having elastomeric properties (rubber elasticity), such as a thermoplastic elastomer or a special transparent resin having impact resistance, linear block copolymers respectively represented by the formulae (VI) and modified radial block copolymers respectively represented by the formulae (VII) can be produced:

(VI)

wherein each of l and n is independently an integer of 2 or more, and m is an integer of 1 or more; and

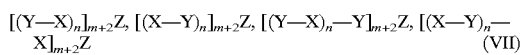

(VII)

wherein m is an integer of 0 or more, and n is an integer of 1 or more; and each Z independently represents a residue of a multifunctional coupling agent, such as dimethyldichlorosilane, methylene chloride, silicon tetrachloride, tin tetrachloride or an epoxidized soybean oil, or a residue of a polymerization initiator, such as a multifunctional organometallic compound containing a metal belonging to Group IA of the Periodic Table.

There is no particular limitation with respect to the polymerization method for producing a cyclic monomer unit-containing polymer to be modified in the present invention, and any conventional polymerization method (such as radical, anionic, cationic, ring-opening, condensation, addition or coordination polymerization) can be used as long as a modified polymer satisfying the requirements of the present invention can be finally obtained from the polymer. However, the most preferable polymerization method for obtaining a cyclic monomer unit-containing polymer to be modified is a living anionic polymerization using, as a polymerization catalyst, a complex of at least one organometallic compound containing a metal belonging to Group IA (Group IA metal) with at least one complexing agent (most preferably an amine) to obtain a cyclic monomer unit-containing polymer. If desired, the obtained polymer is hydrogenated. By modifying the thus obtained polymer, a modified cyclic monomer unit-containing polymer which has a desired molecular weight and a desired polymer structure can be obtained.

Examples of metals belonging to Group IA which can be used in the most preferred polymerization method to be employed in the present invention include lithium, sodium, potassium, rubidium, cesium and francium. Among these, lithium, sodium and potassium are preferred. Of these, lithium is especially preferred.

In the present invention, as mentioned above, the complex as a polymerization catalyst to be used in the polymerization is a complex of at least one organometallic compound containing a Group IA metal with at least one complexing agent.

Preferable examples of complexes include complexes of an organolithium compound, an organosodium compound, or an organopotassium compound.

The most preferable complex is a complex of an organolithium compound.

The organolithium compound, which can be preferably used in the polymerization catalyst that is used in the above-mentioned polymerization method, is a compound containing at least one lithium atom bonded to an organic molecule containing at least one carbon atom or to an organic polymer.

Examples of such an organic molecule include a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, and a $C_4$–$C_{20}$ cyclodienyl group.

Examples of organolithium compounds usable in the polymerization method that is used in the present invention include methyllithium, ethyllithium, n-propyllithium, isopropyllithium, n-butyllithium, sec-butyllithium, tert-butyllithium, pentyllithium, hexyllithium, aryllithium, cyclohexyllithium, phenyllithium, hexamethylenedilithium, cyclopentadienyllithium, indenyllithium, butadienyldilithium, and isoprenyldilithium. Further, known oligomeric or polymeric organolithium compounds, each containing a lithium atom in a polymeric molecular chain thereof, such as polybutadienyllithium, polyisoprenyllithium and polystyryllithium, can also be used.

As a preferred organolithium compound, there is no particular limitation with respect to the type thereof as long as it forms a stable complex (compound). However, representative examples of such organolithium compounds include methyllithium, ethyllithium, n-propyllithium, isopropyllithium, n-butyllithium, sec-butyllithium, tert-butyllithium, and cyclohexyllithium.

Of these, n-butyllithium (n-BuLi) is most preferred from a commercial point of view.

The organometallic compounds containing a Group IA metal usable in the above-mentioned polymerization method can be used individually or, if desired, in combination.

As regards the catalyst to be used in the above-mentioned polymerization method, the most preferred complexing agent for forming a complex of an organometallic compound containing a Group IA metal is one or more types of amine.

Examples of amines as complexing agents include an organic amine or an organic polymeric amine, which contains at least one $R^1R^2N$— group (wherein each of $R^1$ and $R^2$ independently represents an alkyl group, an aryl group, or a hydrogen atom) which is a polar group having a non-covalent electron pair capable of coordinating with the organometallic compound containing a Group IA metal to thereby form a complex.

Among these amines, a tert-amine is most preferred.

Preferred examples of tert-amines usable in the present invention include trimethylamine, triethylamine, dimethylaniline, diethylaniline, tetramethyldiaminomethane, tetramethylethylenediamine, tetramethyl-1,3-propanediamine, tetramethyl-1,3-butanediamine, tetramethyl-1,4-butanediamine, tetramethyl-1,6-hexanediamine, tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, diazabicyclo[2.2.2]octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, and hexamethylphosphoric triamide (HMPT).

Most preferred examples of amines include tetramethylmethylenediamine (TMMDA), tetraethylmethylenediamine (TEMDA), tetramethylethylenediamine (TMEDA), tetraethylethylenediamine (TEEDA), tetramethylpropylenediamine (TMPDA), tetraethylpropylenediamine (TEPDA), tetramethylbutylenediamine (TMBDA), tetraethylbutylenediamine (TEBDA), tetramethylpentanediamine, tetraethylpentanediamine, tetramethylhexanediamine (TMHDA), tetraethylhexanediamine (TEHDA), and diazabicyclo-[2.2.2]octane (DABCO).

From the commercial point of view, tetramethylethylenediamine (TMEDA) is an especially preferred example of complexing agents usable in the present invention.

The above-mentioned amines as complexing agents may be used individually or in combination.

With respect to the polymerization catalyst (which is prepared from an organometallic compound containing at least one metal of Group IA (Group IA metal) and at least one complexing agent) to be used for producing-a cyclic conjugated diene polymer by the above-mentioned most preferred polymerization method (i.e., living anionic polymerization), it is desired that the catalyst be one which is prepared from n-butyllithium (n-BuLi) and at least one amine selected from the group consisting of tetramethylmethylenediamine (TMMDA), tetramethylethylenediamine (TMEDA), tetramethylpropylenediamine (TMPDA), and diazabicyclo[2.2.2]octane (DABCO).

From the commercial point of view, it is most preferred that the catalyst be one which is prepared from n-butyllithium (n-BuLi), and tetramethylethylenediamine (TMEDA).

In the above-mentioned most preferred polymerization method, it is preferred that, prior to the polymerization reaction, a complex be prepared by reacting an organometallic compound containing a Group IA metal with at least one amine (as a complexing agent), and the prepared complex be used as a polymerization catalyst.

In the present invention, there is no particular limitation with respect to the method for preparing the complex (polymerization catalyst). If desired, the preparation can be conducted by a conventional method.

Examples of such conventional methods include a method comprising dissolving the organometallic compound containing a Group IA metal in an organic solvent in an atmosphere of a dried inert gas, and adding thereto a solution of the complexing agent (amine); and a method comprising dissolving the complexing agent (amine) in an organic solvent in an atmosphere of a dried inert gas, and adding thereto a solution of the organometallic compound containing a Group IA metal. From these methods, a preferred method can be appropriately selected.

It is preferred that the above-mentioned organic solvent be appropriately selected depending on the type and amount of the organometallic compound and the type and amount of the complexing agent (amine), and be well deaerated and dried prior to use.

The reaction for obtaining the complex of at least one organometallic compound with at least one complexing agent (amine) is generally conducted at $-100°$ C. to $100°$ C.

Examples of inert gases to be used in the preparation of a complex include helium, nitrogen and argon. Of these, nitrogen and argon are preferred from the commercial point of view.

In the preparation of a complex from a Group IA metal-containing organometallic compound and an amine as a complexing agent, which complex is to be used in the above-mentioned most preferred polymerization method for producing a cyclic conjugated diene polymer, it is preferred to employ the following molar ratio with respect to the amine and the Group IA metal contained in the organometallic compound. The molar ratio is:
generally:
A/B=1,000/1 to 1/1,000,
preferably:
A/B=500/1 to 1/500,
more preferably:
A/B=100/1 to 1/100,
still more preferably:
A/B=50/1 to 1/50,
most preferably:
A/B=20/1 to 1/20,
wherein A is the molar amount of the amine (amine compound molecule), and B is the molar amount of the Group IA metal contained in the organometallic compound.

When the above-mentioned molar ratio A/B is within the range as defined above, a stable complex can be obtained in high yield, which can be advantageously used for producing a cyclic conjugated diene polymer having a narrow molecular weight distribution.

When the molar ratio A/B is outside the range as defined above, various disadvantages are likely to be caused such that the production process for the complex becomes costly, and that the complex becomes unstable, so that concurrently with the polymerization reaction, undesirable side reactions, such as a transfer reaction and a Group IA metal hydride elimination reaction, are likely to occur.

As mentioned above, the most preferred method for producing a cyclic conjugated diene polymer is living anionic polymerization using the complex as a polymerization catalyst.

The polymerization method to be employed in the present invention is not specifically limited, and can be conducted by vapor phase polymerization, bulk polymerization or solution polymerization.

The polymerization reaction can be conducted in a batchwise, semibatchwise or continuous manner.

Examples of polymerization solvents to be used in the solution polymerization reaction include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin and norbornane; aromatic hydrocarbons, such as benzene, toluene, xylene, ethylbenzene and cumene; and ethers, such as diethyl ether and tetrahydrofuran.

These polymerization solvents may be used individually or in combination.

Preferred polymerization solvents are aliphatic hydrocarbons, alicyclic hydrocarbons and aromatic hydrocarbons. More preferred polymerization solvents are aliphatic hydrocarbons, alicyclic hydrocarbons and mixtures thereof. Most preferred polymerization solvents are n-hexane, cyclohexane and mixtures thereof.

In the polymerization method for producing a cyclic conjugated diene polymer, the amount of the polymerization catalyst is not specifically limited, and may be varied depending on the intended use of the polymer to be used. However, the polymerization catalyst is generally used in an amount of from $1\times10^{-6}$ mol to $1\times10^{-1}$ mol, preferably from $5\times10^{-6}$ mol to $5\times10^{-2}$ mol, in terms of the molar amount of metal atom per mol of the monomer or monomers.

In the polymerization method, the polymerization reaction temperature can be appropriately selected. However, the polymerization reaction temperature is generally from $-100°$ C. to $150°$ C., preferably from $-80°$ C. to $120°$ C., more preferably from $-30°$ C. to $110°$ C., and most preferably from $0°$ C. to $100°$ C. From a commercial point of view, it is advantageous that the polymerization reaction temperature be from room temperature to $90°$ C.

In the polymerization method, the polymerization reaction time is not specifically limited, and may be varied depending on the intended use of the polymer and the other polymerization reaction conditions. However, the polymerization reaction time is generally not longer than 48 hours, preferably from 1 to 10 hours.

In the polymerization method, it is preferred that the polymerization reaction be conducted in an atmosphere of an inert gas, such as nitrogen, argon or helium. It is especially preferred that such an inert gas be used after being well dried.

With respect to the pressure in the polymerization reaction system, there is no particular limitation, and a widely varied pressure can be chosen as long as the pressure is sufficient to maintain the monomer or monomers and the solvent at a liquid state at a polymerization temperature within the above-mentioned range. Further, care must be taken to prevent the intrusion of impurities, which deactivate a polymerization catalyst or the active terminals of the polymer being formed, such as water, oxygen and carbon dioxide, into the polymerization reaction system.

In the polymerization method, the polymerization catalysts may be used individually or in combination.

In the polymerization method, when a predetermined polymerization degree has been reached, conventional additives may be added to the polymerization reaction system. Examples of such conventional additives include a terminal modifier, such as a halogen gas, carbon dioxide, carbon monoxide, an alkylene oxide, an alkylene sulfide, an isocyanate compound, an imino compound, an aldehyde compound, a ketone compound, a thioketone compound, an ester, a lactone, an amido group-containing compound, a urea compound or an acid anhydride; a terminal-branching agent, such as a polyepoxide, a polyisocyanate, a polyimine, a polyaldehyde, a polyanhydride, a polyester, a polyhalide or a metal halide; a coupling agent, such as dimethyldichlorosilane, methyltrichlorosilane, dimethyldibromosilane, methyltribromosilane, titanocene dichloride, zirconocene dichloride, methylene chloride, methylene bromide, chloroform, carbon tetrachloride, silicon tetrachloride, titanium tetrachloride, tin tetrachloride, an epoxidized soybean oil or an ester; a polymerization terminator; a polymerization stabilizer; and a stabilizing agent, such as a heat stabilizer, an antioxidant or an ultraviolet absorber.

In the polymerization method, conventional heat stabilizers, antioxidants and ultraviolet absorbers can be used.

For example, heat stabilizers, antioxidants and ultraviolet absorbers of phenol type, organic phosphate type, organic phosphite type, organic amine type and organic sulfur type can be used.

The amount of each of the heat stabilizer, antioxidant and ultraviolet absorber to be added is generally from 0.001 to 10 parts by weight, relative to 100 parts by weight of the cyclic conjugated diene polymer.

With respect to the polymerization terminator, any conventional polymerization terminator can be used as long as it can deactivate the polymerization activating species of the polymerization catalyst in the present invention. Preferred examples of polymerization terminators include water, a $C_1$–$C_{10}$ alcohol, a ketone, a polyhydric alcohol (such as ethylene glycol, propylene glycol, or glycerol), a phenol, a carboxylic acid, and a halogenated hydrocarbon.

The amount of polymerization terminator to be added is generally within the range of from 0.001 to 10 parts by weight, relative to 100 parts by weight of the polymer containing a cyclic monomer unit. The polymerization terminator may be added before or simultaneously with the addition of a heat stabilizer, an antioxidant and/or an ultraviolet absorber. Alternatively, the active terminals of the polymer may be deactivated by contacting the active terminals with a molecular hydrogen.

It is most preferred that the modified cyclic monomer unit-containing polymer of the present invention be obtained by a method which comprises polymerizing a cyclic conjugated diene monomer to thereby obtain a cyclic conjugated diene monomer unit-containing polymer and, if desired, subjecting the obtained polymer to hydrogenation to thereby hydrogenate unsaturated carbon-carbon bonds in the polymer, and then modifying the resultant polymer.

One example of the most preferred method for obtaining a cyclic monomer unit-containing polymer as a hydrogenated polymer, comprises polymerizing a cyclic conjugated diene monomer to thereby obtain a polymer, subjecting the obtained polymer to hydrogenation in the presence of a hydrogenation catalyst to thereby hydrogenate a part or all of the unsaturated carbon-carbon bonds contained in the cyclic conjugated diene polymer, and modifying the resultant polymer.

In this instance, a desired hydrogenated polymer can be obtained by subjecting a cyclic conjugated diene polymer to hydrogenation after a predetermined polymerization degree has been reached in the polymerization reaction for obtaining the cyclic conjugated diene polymer.

For performing the hydrogenation reaction, the following methods can be mentioned:
  a batchwise method which comprises stopping a polymerization reaction by deactivating a polymerization catalyst, adding a hydrogenation catalyst to the same reactor as used in the polymerization reaction, and introducing hydrogen gas into the reactor, to thereby obtain a hydrogenated polymer;
  a semi-batchwise method which comprises stopping a polymerization reaction by deactivating a polymerization catalyst to thereby obtain a polymer solution, transferring the obtained polymer solution to a reactor other than that used in the polymerization reaction, adding a hydrogenation catalyst to the reactor, and introducing hydrogen gas into the reactor, to thereby obtain a hydrogenated polymer; and
  a continuous method which comprises continuously conducting a polymerization reaction and a hydrogenation reaction in a tubular reactor, to thereby obtain a hydrogenated polymer.

From the above-mentioned methods, a desirable method can be appropriately selected.

As mentioned above, the hydrogenation reaction of a cyclic conjugated diene polymer is conducted in an atmosphere of hydrogen gas in the presence of hydrogenation catalyst.

More illustratively stated, the hydrogenation reaction is generally conducted by a method in which a polymer solution is maintained at a predetermined temperature in an atmosphere of hydrogen gas or an inert gas, and a hydrogenation catalyst is added to the polymer solution while agitating or not agitating, followed by introduction of hydrogen gas into the reaction system until a predetermined level of pressure is reached.

The hydrogenation reaction can be conducted in a conventional manner, namely, in a batchwise, a semi-batchwise or a continuous manner. These manners can be employed individually or in combination.

The type and amount of the hydrogenation catalyst to be used in the present invention are not particularly limited as long as the catalyst used can provide a degree of hydrogenation such that the intended amount of a saturated cyclic molecular unit is introduced. However, it is preferred that the hydrogenation catalyst to be used in the present invention be a homogeneous hydrogenation catalyst (organometallic compound or complex) or heterogeneous hydrogenation catalyst (solid catalyst) which contains at least one member selected from the group consisting of metals belonging to Groups IV A to VIII of the Periodic Table and rare earth metals.

It is most preferred that the hydrogenation catalyst be a homogeneous hydrogenation catalyst, i.e., an organometallic compound or complex which contains at least one member selected from the group consisting of Group IV A to VIII metals and rare earth metals.

These organometallic compounds or complexes as a hydrogenation catalyst can be supported by an inorganic compound, such as a silica or a zeolite, or an organic polymer, such as a crosslinked polystyrene.

Examples of metals contained in the hydrogenation catalyst to be used in the present invention include titanium, zirconium, hafnium, chromium, molybdenum, tungsten, manganese, rhenium, iron, cobalt, nickel, ruthenium, rhodium, palladium, osmium, iridium, platinum, lanthanum, cerium, praseodymium, neodymium, promethium, samarium, europium, gadolinium, terbium, dysprosium, holmium, erbium, thulium, ytterbium and lutetium. Among these, titanium, zirconium, hafnium, rhenium, cobalt, nickel, ruthenium, rhodium, palladium, cerium, neodymium, samarium, europium, gadolinium and ytterbium are preferred.

Titanium, cobalt, nickel, ruthenium, rhodium and palladium are especially preferred.

In order for organometallic compounds or complexes, which contain the above-mentioned metals, to be soluble in a solvent used, it is requisite that a ligand, such as hydrogen, a halogen, a nitrogen compound or an organic compound, be coordinated with or bonded to such metals. These ligands can be used individually or in combination. When these ligands are used in combination, it is preferred that an appropriate combination of ligands be selected so that the resultant organometallic compound or complex becomes soluble in the solvent used.

Examples of ligands include hydrogen; fluorine; chlorine; bromine; nitrogen monoxide; carbon monoxide; an organic compound containing a functional group, such as a hydroxyl group, an ether group, an amino group, a thiol group, a phosphine group, a carbonyl group, an olefin group or a diene group; or a non-polar organic compound containing no functional group.

Examples of organic ligands include aldehydes, such as salicylaldehyde, 2-hydroxy-1-naphthalaldehyde and 2-hydroxy-3-naphthalaldehyde; hydroxyphenones, such as 2'-hydroxyacetophenone, 2'-hydroxybutyrophenone and 2'-hydroxypropiophenone; diketones, such as acetylacetone, benzoylacetone, propionylacetone, isobutylacetone, valerylacetone and ethylacetylacetone; carboxylic acids, such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid (synthetic acid comprising a mixture of isomers of $C_{10}$ monocarboxylic acids, manufactured and sold by Shell Chemical Co.), phenylacetic acid, benzoic acid, 2-naphthoic acid, maleic acid, succinic acid, hexanethiol acid, 2,2-dimethylbutane thionic acid, decane thionic acid and thiobenzoic acid; organic phosphoric acids, such as dibutyl phosphate, dipentyl phosphate, dihexyl phosphate, diheptyl phosphate, dioctyl phosphate, bis(2-ethylhexyl)phosphate, bis(1-methylheptyl)phosphate, dilauryl phosphate, dioleyl phosphate, diphenyl phosphate, bis(p-nonylphenyl) phosphate, bis[poly(ethylene glycol)-p-nonylphenyl] phosphate, (butyl)(2-ethylhexyl)phosphate, (1-methylheptyl)(2-ethylhexyl)phosphate,(2-ethylhexyl)(p-nonylphenyl)phosphate, monobutyl 2-ethylhexylphosphonate, mono-2-ethylhexyl 2-ethylhexylphosphonate, mono-2-ethylhexyl phenylphosphonate, mono-p-nonylphenyl 2-ethylhexyl phosphonate, mono-2-ethylhexyl phosphonate, mono-1-methylheptyl phosphonate, mono-p-nonylphenyl phosphonate, dibutyl phosphinic acid, bis(2-ethylhexyl) phosphinic acid, bis(1-methylheptyl)phosphinic acid, dilauryl phosphinic acid, dioleyl phosphinic acid, diphenyl phosphinic acid, bis(p-nonylphenyl)phosphinic acid, butyl(2-ethylhexyl)phosphinic acid, (2-ethylhexyl)(1-methylheptyl) phosphinic acid, (2-ethylhexyl)(p-nonylphenyl)phosphinic acid, butyl phosphinic acid, 2-ethylhexyl phosphinic acid, 1-methylheptyl phosphinic acid, oleyl phosphinic acid, lauryl phosphinic acid, phenyl phosphinic acid, and p-nonylphenyl phosphinic acid; alcohols, phenols and thiols, such as ethyl alcohol, n-propyl alcohol, iso-propyl alcohol, tertbutyl alcohol, tert-amyl alcohol, n-hexyl alcohol, cyclohexyl alcohol, allyl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-iso-butanethiol, thiophenol, 2-naphthalenethiol, cyclohexanethiol, 3-methyl cyclohexanethiol, 2-naphthalenethiol, benzene methanethiol, and 2-naphthalene methanethiol; acetylacetone, tetrahydrofuran, diethyl ether, dimethyl sulfoxide, pyridine, ethylene diamine, dimethyl formamide, triphenyl phosphine, a cyclopentadienyl group, a substituted cyclopentadienyl group, an indenyl group, a fluorenyl group, a π-allyl group, a substituted allyl group, a cyclooctadienyl group, a methyl group, an ethyl group, a butyl group, a phenyl group and a tolyl group.

These ligands can be used individually or in combination. When these ligands are used in combination, it is especially preferred that an appropriate combination of ligands be selected so that the resultant organometallic compound or complex becomes soluble in the solvent used.

Various types of hydrogenation catalysts can be used individually or, if desired, in combination.

Further, from a commercial point of view, it is most preferred that, as a hydrogenation catalyst, use be made of a combination of an organometallic compound or complex which contains at least one member selected from the group consisting of Group IV A to VIII metals and rare earth metals, and at least one organometallic compound containing a metal selected from the group consisting of Group IA to IIA metals and Group IIIB metals, such as alkyllithium, alkylmagnesium, and alkylaluminum.

Specific examples of an organometallic compound containing a metal selected from the group consisting of Group IA to IIA metals and Group IIIB metals include an alkyllithium, such as methyllithium, ethyllithium, n-propyllithium, i-propyllithium, n-butyllithium, secbutyllithium, tert-butyllithium, pentyllithium, hexyllithium, phenyllithium, or cyclopentadienyllithium; an alkylmagnesium, such as dimethylmagnesium, diethylmagnesium or dibutylmagnesium; and an alkylaluminum, such as trimethylaluminum, triethylaluminum, triisopropylaluminum, tri-n-butylaluminum, triisobutylaluminum, trihexylaluminum, tricyclohexylaluminum, diethylaluminum hydride, diisobutylaluminum hydride, methylaluminoxane or ethylaluminoxane. These organometallic compounds can be used individually or in combination.

In the present invention, when the cyclic monomer unit-containing polymer (i.e., a polymer to be modified to obtain the polymer of the present invention) is a hydrogenated polymer, the amount of hydrogenation catalyst to be used for a hydrogenation reaction can be appropriately determined depending on the type (e.g., the structure of the main chain and molecular weight) of the polymer to be hydrogenated, or the hydrogenation reaction conditions (e.g., solvent, temperature, concentration, and viscosity of the solution). However, the amount of the hydrogenation catalyst is generally within the range of from 0.1 to 100,000 ppm, preferably from 1 to 50,000 ppm, more preferably from 5 to 10,000 ppm, most preferably from 10 to 10,000 ppm, in terms of the concentration of metal atoms, based on the amount of the polymer to be hydrogenated.

When the amount of the hydrogenation catalyst is extremely small, a satisfactory rate of hydrogenation reaction cannot be obtained. When the amount of the hydrogenation catalyst is too large, the rate of hydrogenation reaction becomes high, but the use of too large an amount of the hydrogenation catalyst is disadvantageous from an economical point of view. In addition, when the amount of the hydrogenation catalyst is too large, the separation and recovery of the hydrogenation catalyst become difficult, leading to undesirable results, for example, adverse effects of the residual catalyst on the polymer.

In the present invention, it is preferred that a solvent to be used for the hydrogenation reaction be inert to the hydrogenation catalyst and capable of well dissolving therein the polymer to be hydrogenated and the hydrogenation catalyst.

Examples of solvents to be used in the hydrogenation reaction include aliphatic hydrocarbons, such as n-pentane, n-hexane, n-heptane, n-octane, iso-octane, n-nonane and n-decane; alicyclic hydrocarbons, such as cyclopentane, methylcyclopentane, cyclohexane, methylcyclohexane, cycloheptane, cyclooctane, decalin, and norbornane; aromatic hydrocarbons, such as benzene, toluene, xylene, ethylbenzene and cumene; hydrocarbon halogenides, such as methylene chloride, dichloroethane, chlorobenzene, dichlorobenzene and trichlorobenzene; and ethers, such as diethyl ether, diglyme, triglyme and tetrahydrofuran. These solvents may be used individually or in combination. Suitable solvents can be appropriately selected, depending on the properties of the polymer to be hydrogenated or the hydrogenation reaction conditions.

From a commercial point of view, it is preferred to choose solvents to be used for the hydrogenation reaction from aliphatic hydrocarbons, alicyclic hydrocarbons, and aromatic hydrocarbons. Most preferred solvents are aliphatic hydrocarbons, alicyclic hydrocarbons, and a mixture of these solvents.

In the present invention, from a commercial point of view, it is advantageous that the polymerization reaction and the hydrogenation reaction be consecutively conducted. Therefore, it is preferred that the solvent to be used for the hydrogenation reaction be the same as the solvent used for the polymerization reaction.

In the present invention, there is no particular limitation with respect to the concentration of a polymer solution to be subjected to hydrogenation. However, the polymer concentration of the polymer solution is preferably from 1 to 90 wt %, more preferably from 2 to 60 wt %, most preferably from 5 to 40 wt %.

When the polymer concentration of the polymer solution is lower than the above-mentioned range, the operation for hydrogenation becomes inefficient and disadvantageous from an economical point of view. On the other hand, when the concentration of the polymer solution is higher than the above-mentioned range, the viscosity of the polymer solution becomes high, leading to a lowering of the reaction rate.

In the present invention, the reaction temperature for hydrogenation can be appropriately selected, but is generally from −78° C. to 500° C., preferably from −10° C. to 300° C., and more preferably from 20° C. to 250° C.

When the reaction temperature is lower than the above-mentioned range, a satisfactorily high reaction rate cannot be achieved. On the other hand, when the reaction temperature is higher than the above-mentioned range, disadvantages are likely to be caused such that not only is the hydrogenation catalyst deactivated, but also the polymer is deteriorated.

The pressure of the hydrogenation reaction system is generally from 0.1 to 500 kg/cm²G, preferably from 1 to 400 kg/cm²G, more preferably from 2 to 300 kg/cm²G.

When the pressure of the hydrogenation reaction system is lower than the above-mentioned range, a satisfactorily high reaction rate cannot be achieved. When the pressure is higher than the above-mentioned range, the reaction rate becomes high, but an expensive pressure-resistant reaction apparatus is required, which is economically disadvantageous. Further, such a high pressure may cause hydrocracking of the polymer during the hydrogenation reaction.

The reaction time for hydrogenation is not particularly limited, and may vary depending on the type and amount of the hydrogenation catalyst, the concentration of the polymer solution, and the temperature and pressure of the reaction system. However, the reaction time for hydrogenation is generally from 5 minutes to 240 hours.

If desired, after completion of the hydrogenation reaction, the hydrogenation catalyst can be recovered from the resultant hydrogenation reaction mixture by a conventional method, such as adsorption-separation of the catalyst by means of an adsorbent, or removal of the catalyst by washing with water or a lower alcohol in the presence of an organic acid and/or an inorganic acid.

The separation and recovery of the hydrogenated cyclic conjugated diene polymer from the hydrogenation reaction mixture can be conducted by a conventional method which is generally used for recovering a conventional polymer from a hydrogenation reaction mixture.

Examples of such conventional methods include a steam-coagulation method comprising directly contacting a hydrogenation reaction mixture with steam; a precipitation method comprising adding a poor solvent for a polymer to a hydrogenation reaction mixture, thereby precipitating the polymer; a method comprising heating a hydrogenation reaction mixture in a hydrogenation reactor, thereby distilling off the solvent; and a method comprising extruding a hydrogenation reaction mixture using an extruder having a vent, while distilling off a solvent through the vent, thereby obtaining a pelletized polymer. A most appropriate method can be selected depending on the properties of the cyclic conjugated diene polymer to be hydrogenated and the solvent used.

When a modified cyclic monomer unit-containing polymer of the present invention has a carbon-to-carbon unsaturated bond, if desired, an addition reaction other than hydrogenation may be performed at the carbon-to-carbon unsaturated bond using a conventional technique.

As already mentioned above, in the formula (I), each of S to X, which are modifying groups and which are the same or different, is independently a functional group or an organic compound residue containing the functional group, in which the functional group contains at least one member selected from the group consisting of oxygen, nitrogen, sulfur, silicon, phosphorus and halogen, including fluorine, chlorine, bromine and iodine. Further, in the formula (I), s to x are, respectively, weight percentages of modifying groups S to X, based on the weight of the polymer, and satisfy the following requirements:

$$0 < s+t+u+v+w+x < 100,$$

and $$0 \leq s, t, u, v, w, x < 100.$$

With respect to a method for conducting an addition reaction to bond the functional group or the organic compound residue containing the functional group to the cyclic monomer unit-containing polymer which is a starting material for the modified polymer of the present invention, any conventional methods can be employed, in which the cyclic monomer unit-containing polymer to be subjected to the addition reaction may be in the form of a polymer solution, a molten polymer or a solid polymer. Examples of such methods include a method comprising bonding the functional group or the organic compound residue containing the functional group to the cyclic monomer unit-containing polymer by an ene reaction; a method comprising bonding the functional group or the organic compound residue containing the functional group to the cyclic monomer unit-containing polymer by a radical reaction in the presence of or in the absence of a radical initiator; and a method comprising forming a cyclic monomer unit-containing polymer having active terminals by, for example, a living anionic polymerization reaction, and bonding the functional group or the organic compound residue containing the functional group to one or both active terminals of the polymer. Of these methods, a preferable method can be appropriately selected.

In the present invention, the content of the functional group or the organic compound residue containing the functional group in the modified cyclic monomer unit-containing polymer is generally within the range of from 0.001 wt % to less than 100 wt %, preferably from 0.005 to 80 wt %, more preferably 0.01 to 50 wt %, especially preferably from 0.05 to 40 wt %. Further, the most preferred range is from 0.1 to 20 wt %.

Preferred examples of functional groups to be bonded to the cyclic monomer-containing polymer or functional groups contained in the organic compound residue include a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido group, an amidine group, a nitrile group, a nitro group, an isocyano group, a cyanato group, an isocyanato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehyde group, a thioketone group, a phosphoric acid group, a phosphonic acid group and a phosphinic acid group.

Especially preferred examples of functional groups to be bonded to the cyclic monomer-containing polymer or functional groups contained in the organic compound residue include a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group. These functional groups or organic compound residues containing these functional groups can be used individually or in combination.

Representative examples of reactive reagents, which contain at least one modifying group selected from the group consisting of a functional group and an organic compound residue containing the functional group, and which can be used to bond the at least one modifying group to the cyclic monomer unit-containing polymer by an addition reaction, include the compounds of the following categories (i) to (iii).

(i) Unsaturated carboxylic acids and derivatives thereof

Specific examples of unsaturated carboxylic acids and derivatives thereof (such as esters, anhydrides, metal salts, amides, imides and acid halides) include acrylic acid, methacrylic acid, maleic acid, itaconic acid, citraconic acid, fumaric acid, Hi-mic acid, crotonic acid, mesaconic acid, sorbic acid, tetrahydrophthalic acid, methyltetrahydrophthalic acid, endocis-bicyclo[2.2.1]hepto-5-ene-2,3-dicarboxylic acid (Nadic Acid®), methyl-endocis-bicyclo[2.2.1]hepto-5-ene-2,3-dicarboxylic acid (Methylnadic Acid®), a metal salt of (meth)acrylate, methyl (meth)acrylate, ethyl (meth)acrylate, dimethyl maleate, diethyl maleate, dimethyl succinate, diethyl succinate, dimethyl fumarate, diethyl fumarate, maleic anhydride, trimellitic anhydride, pyromellitic anhydride, succinic anhydride, itaconic anhydride, citraconic anhydride, Hi-mic acid anhydride, phthalic anhydride, tetrahydrophthalic anhydride, methyl tetrahydrophthalic anhydride, maleimide, succinimide, phthalimide, (meth)acrylic chloride, (meth)acrylic bromide, (meth)acrylic iodide, maleic chloride, maleic bromide, maleic iodide, itaconic chloride, itaconic bromide, itaconic iodide, citraconic chloride, citraconic bromide, citraconic iodide, fumaric chloride, fumaric bromide, fumaric iodide, Hi-mic acid chloride, Hi-mic acid bromide, Hi-mic acid iodide, crotonic chloride, crotonic bromide, crotonic iodide, mesaconic chloride, mesaconic bromide and mesaconic iodide. Of these compounds, unsaturated dicarboxylic acids and anhydrides thereof are especially preferred. From a commercial point of view, maleic anhydride is most preferred.

(ii) Epoxy-containing compounds

Specifically, unsaturated epoxy compounds having, in a molecule thereof, both of at least one unsaturated bond and at least one epoxy can be mentioned. Examples of such epoxy-containing compounds include an unsaturated glicidyl ester represented by the following formula:

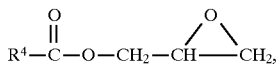

wherein $R^4$ is an organic compound group having at least one unsaturated bond;

an unsaturated glicidyl ether represented by the following formula:

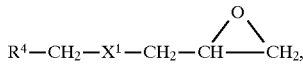

wherein $R^4$ is an organic compound group having at least one unsaturated bond, and $X^1$ is an ether group represented by the formula —$CH_2$—O— or the formula

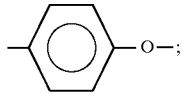

and
an alkenyl epoxy compound represented by the following formula:

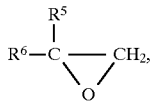

wherein $R^5$ is a hydrogen atom or an alkyl group, and $R^6$ is an organic compound group having at least one unsaturated bond.

More specific examples of the epoxy-containing compounds include mono- or di-glicidyl esters of unsaturated carboxylic acids, such as acrylic acid, methacrylic acid, maleic acid, itaconic acid, citraconic acid, fumaric acid, Hi-mic acid, crotonic acid, mesaconic acid, sorbic acid, tetrahydrophthalic acid, methyltetrahydrophthalic acid, endo-cis-bicyclo[2.2.1]hepto-5-ene-2,3-dicarboxlylic acid (Nadic Acid®) and methyl-endo-cis-bicyclo[2.2.1]hepto-5-ene-2,3-dicarboxlylic acid (Methylnadic Acid®); mono-, di- or tri-glicygdyl ester of butenetricarboxylic acid; glycidyl ester of p-styrenecarboxylic acid; styrene-p-glicidyl ether; 3,4-epoxy-1-butene; 3,4-epoxy-3-methyl-1-butene; 3,4-epoxy-1-pentene; 3,4-epoxy-3-methyl-1-pentene and 5,6-epoxy-1-hexene. Of these compounds, unsaturated carboxylic glicidyl esters are especially preferred. From a commercial point of view, glycidyl ester of (meth)acrylic acid is most preferred.

(iii) Organic silicon compounds

Specifically, organic silicon compounds having, in a molecule thereof, both of at least one unsaturated bond and at least one functional group having no unsaturated bond, can be mentioned.

Examples of such organic silicon compounds include those which are represented by the following formulae:

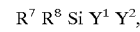

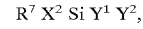

and

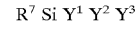

wherein each of $R^7$ and $R^8$ is independently an unsaturated organic compound residue, $X^2$ is a saturated organic compound residue, and each of $Y^1$, $Y^2$ and $Y^3$ is independently a functional group other than an unsaturated organic compound residue.

Examples of $R^7$ and $R^8$ include vinyl, acryl, methacryl, butenyl, hexenyl, cyclohexenyl, cyclopentadienyl and octenyl. Of these examples, groups containing a terminal olefinic unsaturated bond are especially preferred. Further examples of $R^7$ and $R^8$ include unsaturated organic compound residues having a terminal unsaturated acid ester bond, such as those which are represented by the following formulae:

$$CH_2=C(CH_3)COO(CH_2)_3-,$$

$$CH_2=C(CH_3)COO(CH_2)_2-O-(CH_2)_3-,$$

and $$CH_2=C(CH_3)COO(CH_2)OCH_2CH(OH)CH_2O(CH_2)_3-.$$

Of these examples, compound residues having a vinyl group are preferred.

Examples of the above-mentioned $X^2$, which is an organic compound residue having no unsaturated bond, include a $C_1-C_{20}$ hydrocarbon group and a halogen-substituted $C_1-C_{20}$ hydrocarbon group.

Examples of the above-mentioned $Y^1$, $Y^2$ and $Y^3$, each of which is independently a functional group other than an unsaturated organic compound residue, include an alkoxy group, such as methoxy, ethoxy, butoxy or methylethoxy; an alkyl(aryl)alkoxy group; an acyloxy group, such as formyloxy, acetoxy or propinoxy; oxime groups, such as those which are represented by the following formulae:

$$-ON=C(CH_3)_2,$$

$$-ON=CHCH_2C_2H_5,$$

and $$-ON=C(C_6H_5)_2;$$

and an amino group, a substituted amino group and a substituted aminoaryl group, such as those which are represented by the following formulae:

$$-NH_2,$$

$$-NHCH_3,$$

$$-NHC_2H_5,$$

and $$-NH(C_6H_5).$$

Especially preferred organic silicon compounds are represented by the formula $R^7SiY^1Y^2Y^3$ (wherein each of $R^7$, $Y^1$, $Y^2$ and $Y^3$ is as defined above). Commercially most preferred examples of such organic silicon compounds include vinyl trisalkoxy silane, such as vinyl trimethoxysilane, vinyl triethoxysilane and vinyl tris (methoxyethoxy)silane, γ-(meth) acryloyloxypropyltrialkoxysilane, vinylmethyldiethoxysilane and vinylphenyl dimethoxysilane.

In the production of the modified cyclic monomer unit-containing polymer of the present invention, the amount of the reactive reagent to be used for modification is varied according to the type of the reactive reagent, the reaction conditions of the modification reaction for bonding a modifying group to the cyclic monomer unit-containing polymer of the formula (I'), the amount of the modifying group to be bonded, and the like. With respect to the amount of the reactive reagent to be used, there is no particular limitation as long as, in the formula (I), s to x, which are, respectively, weight percentages of modifying groups S to X, based on the weight of the polymer of the formula (I), satisfy the following requirements:

$$0<s+t+u+v+w+x<100,$$

and $$0 \leq s, t, u, v, w, x<100.$$

When the above-mentioned requirements on the weight percentages of modifying groups S to X are not satisfied, not only the molding properties of a composite resin material containing the modified cyclic monomer unit-containing polymer, but also the appearance of a shaped article produced from the composite resin material is adversely affected. In the preferred form of the modified polymer of the present invention, s to x of formula (I) generally satisfy the following requirement:

$$0.001<s+t+u+v+w+x<100.$$

It is still preferred that s to x of formula (I) satisfy the following requirement:

$$0.005 \leq s, t, u, v, w, x \leq 80.$$

It is still more preferred that s to x of formula (I) satisfy the following requirement:

$$0.01<s+t+u+v+w+x \leq 50.$$

It is still further preferred that s to x of formula (I) satisfy the following requirement:

$$0.05<s+t+u+v+w+x \leq 40.$$

It is most preferred that s to x of formula (I) satisfy the following requirement:

$$0.1 \leq s, t, u, v, w, x \leq 20.$$

The above-mentioned reactive reagents may be used individually or in combination.

With respect to the method for modifying the cyclic monomer unit-containing polymer of formula (I') with the reactive reagent, there is no particular limitation, and any of the conventional modification techniques can be employed. However, as preferred examples of modification methods, there can be mentioned a method in which the cyclic monomer unit-containing polymer of formula (I') and the reactive reagent are dissolved in an appropriate solvent and reacted with each other in the presence of a radical reaction initiator, and a method in which the cyclic monomer unit-containing polymer of formula (I'), the reactive reagent and a radical reaction initiator are mixed together and reacted in a molten state.

Examples of radical reaction initiators include a compound which produces a radical upon being thermally decomposed, such as an organic peroxide and an azo compound. Especially preferred is an organic peroxide in which a thermal decomposition temperature at which the half life becomes 1 minute is 120° C. or more. Specific examples of such organic peroxides include benzoyl peroxide, dicumyl peroxide, 2,5-dimethyl-2,5-di(tert-butylperoxy)hexane, 2,5- dimethyl-2,5-di(tert-butylperoxy)hexyne-3,1,3-bis(tert-butylperoxyisopropyl)benzene, 1,4-bis(tert-butylperoxyisopropyl)benzene, di-tert-butyloperoxide, cumene hydroperoxide and tert-butylperbenzoate.

In the production of the modified cyclic monomer unit-containing polymer of the present invention, customary additives, such as an antioxidant, an ultraviolet ray absorbing agent, a lubricant, a pigment, a flame retardant and an inorganic filler, can be used with no particular limitation as long as the modification for obtaining the polymer of the present invention is not adversely affected.

Further, if desired, in the molding of the polymer of the present invention, various customary additives can be used in amounts which are usually used in the molding of conventional polymers. Examples of such additives include a thermal stabilizer (such as a phenol type, phosphorus type or sulfur type antioxidant), a light stabilizer, an antistatic agent, a slip agent, an antiblocking agent, an antifogging agent, a plasticizer, a lubricant, a synthetic oil, a natural oil, an inorganic filler, an organic filler, a colorant, and a pigment.

BEST MODE FOR CARRYING OUT THE INVENTION

Hereinbelow, the present invention will be described in more detail with reference to the following Reference Examples and Examples, but they should not be construed as limiting the scope of the present invention.

Reference Example 1
(Preparation of a polymerization catalyst)

In an atmosphere of dried argon gas, a given amount of tetramethylethylenediamine (TMEDA) is dissolved in a mixed solvent of cyclohexane and n-hexane having a cyclohexane/n-hexane ratio of 9/1 (V/V). The resultant solution is cooled to and maintained at −10° C. Then, in the atmosphere of dried argon gas, an n-hexane solution of n-butyllithium (n-BuLi) is gradually added to the solution of TMEDA in cyclohexane/n-hexane in an amount such as would provide a TMEDA/n-BuLi molar ratio of 1/4. As a result, a complex to be used as a polymerization catalyst is obtained.

(Polymerization for producing a cyclohexadiene homopolymer)

A well dried 100 ml Schlenk tube is purged with dried argon gas by a conventional method. 3.00 g of 1,3-cyclohexadiene and 20.0 g of cyclohexane are charged in the Schlenk tube. While maintaining the temperature of the resultant solution at room temperature, the above-obtained complex of TMEDA and n-BuLi is added to the solution in an amount of 0.07 mmol in terms of the amount of lithium atom, and a polymerization reaction is conducted at 30° C. for 4 hours in a dried argon atmosphere.

After that period of time, a 10 wt % solution of 2,6-bis(t-butyl)-4-methylphenol (BHT) in methanol is added to the reaction mixture, to thereby terminate the polymerization reaction. Then, the resultant reaction mixture is treated with a large amount of a mixture of methanol and hydrochloric acid, thereby separating a polymer formed in the reaction mixture. The separated polymer is washed with methanol and then, dried at 80° C. in vacuo, thereby obtaining a white mass of the cyclohexadiene homopolymer in a yield of 100 wt %.

The number average molecular weight ($\overline{Mn}$)*) of the obtained homopolymer is 44,500. The molecular weight distribution ($\overline{Mw}/\overline{Mn}$)*) is 1.07.

*) For determining the number average molecular weight and weight average molecular weight (and also the molecular weight distribution) of the polymer, the polymer is dissolved in 1,2,4-trichlorobenzene (TCB), and the resultant solution is subjected to gel permeation chromatography (GPC). The number average molecular weight and weight average molecular weight of the polymer are determined using a calibration curve obtained from standard polystyrenes.

Reference Example 2
(Cyclohexadiene-butadiene diblock copolymer)

A well dried 5-liter high-pressure autoclave having an electromagnetic induction agitator is purged with dried nitrogen gas by a conventional method.

2,800 g of cyclohexane and 60 g of 1,3-cyclohexadiene are charged in the autoclave. A polymerization catalyst (complex) obtained in the same manner as in Reference Example 1 is added to the autoclave in an amount of 10.48 mmol in terms of the amount of lithium atom. A polymerization reaction is conducted at 30° C. for 4 hours, to thereby obtain a cyclohexadiene homopolymer. Subsequently, 280 g of butadiene is charged in the autoclave, and a polymerization reaction is further conducted at 60° C. for 30 minutes to thereby obtain a cyclohexadiene-butadiene diblock copolymer. After that period of time, n-heptanol is added to the resultant reaction mixture, to thereby terminate the polymerization reaction. To the reaction mixture is added a stabilizing agent [Irganox B215 (0037HX), manufactured and sold by CIBA GEIGY, Switzerland] and then, removal of the solvent is conducted by a conventional method, to thereby obtain a cyclohexadiene-butadiene diblock copolymer.

The number average molecular weight ($\overline{Mn}$)*) of the obtained polymer is 47,500. The molecular weight distribution ($\overline{Mw}/\overline{Mn}$)*) is 1.10.

Reference Example 3
(Cyclohexadiene-butadiene triblock copolymer)

For obtaining a cyclohexadiene-butadiene diblock copolymer, substantially the same polymerization reaction as described in Reference Example 2 is repeated. To the obtained polymerization reaction mixture is added 1,3-cyclohexadiene in the same amount as used in producing the cyclohexadiene homopolymer in Reference Example 2, i.e., 60 g, and a polymerization reaction is further conducted at 60° C. for 2 hours, to thereby obtain a cyclohexadiene-butadiene triblock copolymer.

After that period of time, substantially the same operations as conducted subsequent to the polymerization reaction in Reference Example 2 are repeated to thereby obtain a cyclohexadiene-butadiene triblock copolymer exhibiting rubber elasticity.

The number average molecular weight ($\overline{Mn}$)*) of the obtained polymer is 97,000. The molecular weight distribution ($\overline{Mw}/\overline{Wn}$)*) is 1.05.

Reference Example 4
(Cyclohexadiene-styrene diblock copolymer)

A well dried 5-liter high-pressure autoclave having an electromagnetic induction agitator is purged with dried nitrogen gas by a conventional method.

2,800 g of cyclohexane and 60 g of 1,3-cyclohexadiene are charged in the autoclave. A polymerization catalyst (complex) obtained in the same manner as in Reference Example 1 is added to the autoclave in an amount of 10.48 mmol in terms of the amount of lithium atom. A polymerization reaction is conducted at 30° C. for 4 hours, to thereby obtain a cyclohexadiene homopolymer. Subsequently, 280 g of styrene is charged in the autoclave, and a polymerization reaction is further conducted at 70° C. for 70 minutes to thereby obtain a cyclohexadiene-styrene diblock copolymer.

After that period of time, substantially the same operations as conducted subsequent to the polymerization reaction in Reference Example 2 are repeated to thereby obtain a cyclohexadiene-styrene diblock copolymer.

The number average molecular weight ($\overline{Mn}$)*) of the obtained polymer is 49,000. The molecular weight distribution ($\overline{Mw}/\overline{Mn}$)*) is 1.12.

EXAMPLE 1
(Modification of a cyclohexadiene homopolymer)

In an atmosphere of dried nitrogen gas, 100 parts by weight of the cyclohexadiene homopolymer obtained in Reference Example 1 and 120 parts by weight of maleic anhydride are added to 200 cm$^3$ of 1,2,4-trichlorobenzene (TCB) to thereby obtain a mixture. The obtained mixture is heated to 120° C. while stirring, to thereby completely dissolve the cyclohexadiene homopolymer and maleic anhydride in TCB. To the resultant solution is gradually added 24 mmol of a 50% dilution product of benzoyl peroxide with dioctyl phthalate (Nyper BO, manufactured and sold by Nippon Oil & Fats Co., Ltd., Japan), and in the atmosphere of dried nitrogen gas, a reaction is conducted at 120° C. for 5 hours. After completion of the reaction, the resultant reaction mixture is subjected to reprecipitation several times using acetone/TCB, to thereby obtain a maleic anhydride-modified cyclohexadiene homopolymer. The modified cyclohexadiene homopolymer is heated under reduced pressure to remove unreacted maleic anhydride. 2,6-Di(tert-butyl)-4-methylphenol is added as a stabilizer to the modified cyclohexadiene homopolymer in an amount of 0.5 part by weight, based on 100 parts by weight of the modified cyclohexadiene homopolymer, while melt kneading**) at 230° C.

**) The melt kneading is conducted using Labo Plastomil (30C150) (manufactured and sold by Toyo Seiki Co., Ltd., Japan) having a twin-screw extruder (2D20SH) (manufactured and sold by Toyo Seiki Co., Ltd., Japan) connected thereto. A polymer is melt extruded at a revolution rate of 50 rpm at 230° to 280° C., to thereby obtain strands. The obtained strands are pelletized by means of a cutter specially designed for use with the extruder. (In each of the subsequent Examples, melt kneading is conducted using the same apparatus as mentioned above.)

[Titration and identification of maleic anhydride groups in the maleic anhydride-modified cyclohexadiene homopolymer (M—PCHD)]

The content of maleic anhydride groups in M—PCHD is 1.4 wt % as measured by titration using sodium methylate.

Figure 2:
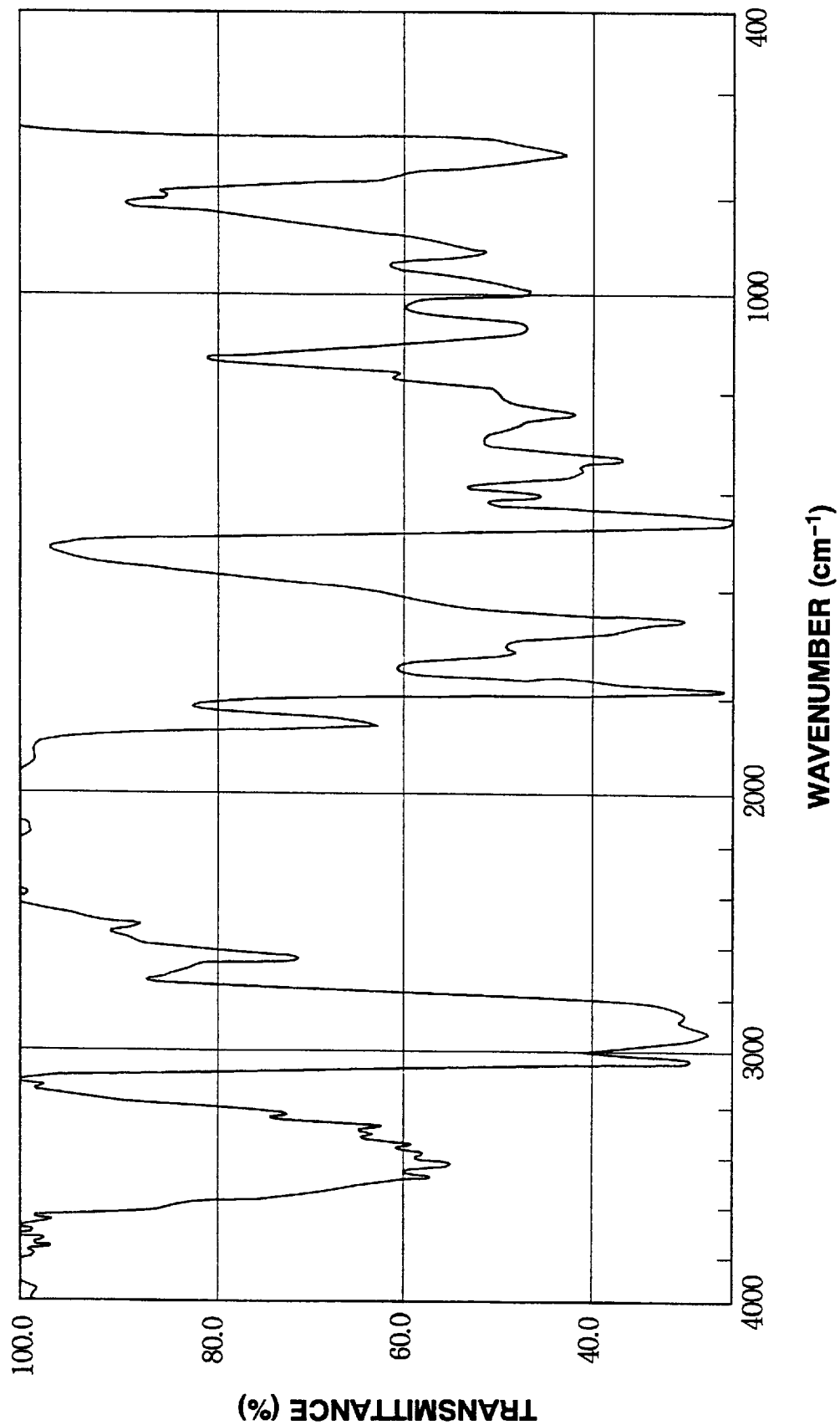
FIG. 2 is a chart showing the infrared absorption spectrum of the maleic anhydride-modified cyclic conjugated diene homopolymer, obtained in Example 1.

The infrared absorption spectra***) of the cyclohexadiene homopolymer obtained in Reference Example 1 and the maleic anhydride-modified cyclohexadiene homopolymer (M—PCHD) obtained in Example 1 are shown in FIG. 1 and FIG. 2, respectively.

***) The infrared absorption spectrum of each of the cyclohexadiene homopolymer and the maleic anhydride-modified cyclohexadiene homopolymer is obtained by the following measuring method. Each polymer is individually subjected to compression molding at 230° to 280° C., to thereby obtain a film. The obtained film is subjected to infrared absorption spectroscopic analysis by a reflection method or transmission method, using an infrared absorption spectrometer (IR 700) manufactured and sold by Japan Spectroscopic Co., Ltd., Japan.

EXAMPLE 2
(Modification of a cyclohexadiene homopolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the cyclohexadiene homopolymer obtained in Reference Example 1 to thereby obtain a mixture. Irganox B215 is added as a stabilizer to the obtained mixture in an amount of 3,000 ppm, based on the weight of the cyclohexadiene homopolymer. While melt kneading the resultant mixture at 180° to 290° C., a reaction is conducted to thereby obtain a maleic anhydride-modified cyclohexadiene homopolymer (M—PCHD). Results are shown in Table 1.

The content of maleic anhydride groups in the obtained M—PCHD is measured in the same manner as in Example 1.

EXAMPLE 3
(Modification of a cyclohexadiene homopolymer)

Substantially the same procedure as in Example 2 is repeated, except that glycidyl methacrylate is used as a modifying agent instead of the maleic anhydride. As a result, a glycidyl methacrylate-modified cyclohexadiene homopolymer (G-PCHD) is obtained.

EXAMPLE 4
(Modification of a cyclohexadiene homopolymer)

2.5 Parts by weight of γ-methacryloyloxypropyltrimethoxysilane (KBM-503, manufactured and sold by The Shin-Etsu Chemical Co., Ltd., Japan) and 0.5 part by weight of 2,5-dimethyl-2,5-di (tert-butyl peroxy)hexane having a purity of 90% or more (Perhexa 25B, manufactured and sold by Nippon Oil & Fats Co., Ltd., Japan) are added to 100 parts by weight of the cyclohexadiene homopolymer obtained in Reference Example 1 to thereby obtain a mixture. Irganox B215 is added as a stabilizer to the obtained mixture in an amount of 3,000 ppm, based on the weight of the cyclohexadiene homopolymer. While melt kneading the resultant mixture at 180° to 290° C., a reaction is conducted to thereby obtain a γ-methacryloyloxypropyltrimethoxysilane-modified cyclohexadiene homopolymer (Si—PCHD).

EXAMPLE 5
(Modification of a cyclohexadiene-butadiene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the cyclohexadiene-butadiene diblock copolymer obtained in Reference Example 2 to thereby obtain a mixture. Irganox B215 is added as a stabilizer to the obtained mixture in an amount of 3,000 ppm, based on the weight of the cyclohexadiene-butadiene diblock copolymer. While melt kneading the resultant mixture at 180° to 230° C., a reaction is conducted to thereby obtain a maleic anhydride-modified cyclohexadiene-butadiene diblock copolymer [M—P(CHD—Bd)].

The content of maleic anhydride groups in the obtained [M—P(CHD—Bd)] is measured in the same manner as in Example 1.

47

EXAMPLE 6
(Modification of a cyclohexadiene-butadiene diblock copolymer)

Substantially the same procedure as in Example 5 is repeated, except that glycidyl methacrylate is used as a modifying agent instead of the maleic anhydride. As a result, a glycidyl methacrylate-modified cyclohexadiene-butadiene diblock copolymer [G—P(CHD—Bd)] is obtained.

EXAMPLE 7
(Modification of a cyclohexadiene-butadiene triblock copolymer)

Substantially the same procedure as in Example 5 is repeated, except that the cyclohexadiene-butadiene triblock copolymer obtained in Reference Example 3 is used instead of the cyclohexadiene-butadiene diblock copolymer. As a result, a maleic anhydride-modified cyclohexadiene-butadiene triblock copolymer [M—P(CHD—Bd—CHD)] is obtained.

EXAMPLE 8
(Modification of a cyclohexadiene-butadiene triblock copolymer)

Substantially the same procedure as in Example 7 is repeated, except that glycidyl methacrylate is used as a modifying agent instead of the As a result,ride. As a result, a glycidyl methacrylate-modified cyclohexadiene-butadiene triblock copolymer [G—P(CHD—Bd—CHD)] is obtained.

EXAMPLE 9
(Modification of a cyclohexadiene-styrene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the cyclohexadiene-styrene diblock copolymer obtained in Reference Example 4 to thereby obtain a mixture. Irganox B215 is added as a stabilizer to the obtained mixture in an amount of 3,000 ppm, based on the weight of the cyclohexadiene-styrene diblock copolymer. While melt kneading the resultant mixture at 180° to 290° C., a reaction is conducted to thereby obtain a maleic anhydride-modified cyclohexadiene-styrene diblock copolymer [M—P(CHD—St)].

The content of maleic anhydride groups in the obtained [M—P(CHD—St)] is measured in the same manner as in Example 1.

Reference Example 5
(Hydrogenation of a cyclohexadiene homopolymer)

A well dried 5-liter high-pressure autoclave having an electromagnetic induction agitator is purged with dried nitrogen gas by a conventional method.

In an atmosphere of dried nitrogen gas, 2,800 g of cyclohexane and 400 g of 1,3-cyclohexadiene are charged in the autoclave. Then, a polymerization catalyst (complex) obtained in the same manner as in Reference Example 1 is added to the autoclave in an amount of 10.48 mmol in terms of the amount of lithium atom. A polymerization reaction is conducted at 30° C. for 4 hours, to thereby obtain a cyclohexadiene homopolymer. After that period of time, n-heptanol is added to the resultant reaction mixture, to thereby terminate the polymerization reaction.

To the reaction mixture is added a hydrogenation catalyst comprised of cobalt trisacetylacetonato [Co(acac)$_3$] and triisobutylaluminum (TIBAL) [Co(acac)$_3$/TIBAL molar ratio: 1/6], in an amount of 50 ppm, in terms of the amount of cobalt atom, based on the weight of the polymer. The autoclave is purged with hydrogen gas. A hydrogenation reaction is conducted under a hydrogen pressure of 35 kg/cm$^2$.G for 4 hours.

After completion of the hydrogenation reaction, the autoclave is cooled to room temperature, and the pressure in the autoclave is lowered to atmospheric pressure. The autoclave is purged with nitrogen gas, and TIBAL is treated, using a conventional technique, by adding methanol to the resultant reaction mixture.

To the reaction mixture is added Irganox B215 (0037HX) (manufactured and sold by CIBA GEIGY, Switzerland) as a stabilizer and then, removal of the solvent is conducted by a conventional method, thereby obtaining a hydrogenated cyclohexadiene homopolymer (polycyclohexane=PCHE).

Results of the measurement by $^1$H-NMR show that the degree of hydrogenation of the cyclohexene rings in the polymer chain structure of the cyclohexadiene homopolymer is 100 mol %.

Reference Example 6
(Hydrogenation of a cyclohexadiene-butadiene diblock copolymer)

A well dried 5-liter high-pressure autoclave having an electromagnetic induction agitator is purged with dried nitrogen gas by a conventional method.

In an atmosphere of dried nitrogen gas, 2,720 g of cyclohexane and 150 g of 1,3-cyclohexadiene are charged in the autoclave. Then, a polymerization catalyst (complex) obtained in the same manner as in Reference Example 1 is added to the autoclave in an amount of 15.36 mmol in terms of the amount of lithium atom. A polymerization reaction is conducted at 30° C. for 6 hours, to thereby obtain a cyclohexadiene homopolymer. Subsequently, 325 g of butadiene is charged in the autoclave, and a polymerization reaction is further conducted at 60° C. for 1 hour to thereby obtain a cyclohexadiene-butadiene diblock copolymer.

After that period of time, the resultant reaction mixture is transferred to a 200-ml autoclave, and substantially the same hydrogenation reaction as described in Reference Example 5 is conducted, except that a hydrogenation catalyst comprised of titanocene dichloride (Cp$_2$TiCl$_2$) and triisobutylaluminum (TIBAL) (Cp$_2$TiCl$_2$/TIBAL molar ratio: 1/6) is used in an amount of 100 ppm, in terms of the amount of titanium atom, based on the weight of the polymer, instead of the catalyst comprised of Co(acac)$_3$ and TIBAL. As a result, a hydrogenated cyclohexadiene-butadiene diblock copolymer is obtained.

Results of the measurement by $^1$H-NMR show that the degree of hydrogenation of the cyclohexadiene polymer block is 0 mol %. With respect to the 1,2-vinyl bond segment and the 1,4-bond segment of the butadiene polymer block, the degrees of hydrogenation of the double bonds thereof are 92.4 mol % and 48.2 mol %, respectively.

Reference Example 7
(Hydrogenation of a cyclohexadiene-butadiene triblock copolymer)

For obtaining a cyclohexadiene-butadiene diblock copolymer, substantially the same polymerization reaction as described in Reference Example 6 is repeated. To the obtained polymerization reaction mixture is added 1,3-cyclohexadiene in the same amount as used in producing the cyclohexadiene homopolymer in Reference Example 6, i.e., 150 g, and a polymerization reaction is further conducted at 60° C. for 2 hours, to thereby obtain a cyclohexadiene-butadiene triblock copolymer.

After that period of time, substantially the same hydrogenation reaction as conducted in Reference Example 6 is repeated, to thereby obtain a hydrogenated cyclohexadiene-butadiene triblock copolymer.

Results of the measurement by $^1$H-NMR show that the degree of hydrogenation of the cyclohexadiene polymer block is 0 mol %. With respect to the 1,2-vinyl bond segment and the 1,4-bond segment of the butadiene polymer block, the degrees of hydrogenation of the double bonds thereof are 91.6.mol % and 46.9 mol %, respectively.

Reference Example 8
(Hydrogenation of a cyclohexadiene-butadiene triblock copolymer)

Substantially the same hydrogenation reaction as conducted in Reference Example 7 is repeated, except that a hydrogenation catalyst comprised of titanocene ditolyl and n-BuLi (titanocene ditolyl/n-BuLi molar ratio: 1/1) is used instead of the catalyst comprised of $CP_2TiCl_2$ and TIBAL. As a result, a hydrogenation cyclohexadiene-butadiene triblock copolymer is obtained.

Results of the measurement by $^1$H-NMR show that the degree of hydrogenation of the cyclohexadiene polymer block is 0 mol %. With respect to the butadiene polymer block, the degree of hydrogenation is 100 mol %.

Reference Example 9
(Hydrogenation of a cyclohexadiene-butadiene triblock copolymer)

For obtaining a cyclohexadiene-butadiene triblock copolymer, substantially the same polymerization reaction as described in Reference Example 7 is repeated, and substantially the same hydrogenation reaction as conducted in Reference Example 6 is repeated, except that the amount of hydrogenation catalyst is changed to 10,000 ppm, in terms of the amount of titanium atom, based on the weight of the polymer. As a result, a hydrogenated cyclohexadiene-butadiene triblock copolymer is obtained.

With respect to both of the cyclohexadiene polymer block and the butadiene polymer block, the degree of hydrogenation is 100 mol %, as determined by $^1$H-NMR.

Reference Example 10
(Hydrogenation of a cyclohexadiene-styrene diblock copolymer)

A well dried 5-liter high-pressure autoclave having an electromagnetic induction agitator is purged with dried nitrogen gas by a conventional method.

In an atmosphere of dried nitrogen gas, 2,800 g of cyclohexane and 120 g of 1,3-cyclohexadiene are charged in the autoclave. A polymerization catalyst (complex) obtained in the same manner as in Reference Example 1 is added to the autoclave in an amount of 13.0 mmol in terms of the amount of lithium atom. A polymerization reaction is conducted at 30° C. for 4 hours, to thereby obtain a cyclohexadiene homopolymer. Subsequently, 280 g of styrene is charged in the autoclave, and a polymerization reaction is further conducted at 70° C. for 70 minutes to thereby obtain a cyclohexadienestyrene diblock copolymer.

After that period of time, n-heptanol is added to the resultant reaction mixture, to thereby terminate the polymerization reaction.

200 ml of the reaction mixture is transferred to a 200-ml autoclave. To the reaction mixture is added a hydrogenation catalyst which comprises 5 wt % of palladium (Pd) supported by barium sulfate ($BaSO_4$) in an amount of 200 wt %, based on the weight of the polymer.

The autoclave is purged with hydrogen gas. The temperature of the autoclave is elevated to 140° C. and then, a hydrogenation reaction is conducted under a hydrogen pressure of 50 kg/cm$^2$.G for 5 hours.

After completion of the hydrogenation reaction, the autoclave is cooled to room temperature, and the pressure in the autoclave is lowered to atmospheric pressure. The autoclave is purged with nitrogen gas. To the reaction mixture is added Irganox B215 (0037HX)(manufactured and sold by CIBA GEIGY, Switzerland) as a stabilizer and then, removal of the solvent is conducted by a conventional method, thereby obtaining a hydrogenated cyclohexadiene-styrene diblock copolymer.

With respect to both of the cyclohexadiene polymer block and the styrene polymer block, the degree of hydrogenation is 100 mol %.

EXAMPLE 10
(Modification of a hydrogenated cyclohexadiene homopolymer)

Substantially the same procedure as in Example 1 is repeated, except that the hydrogenated cyclohexadiene homopolymer obtained in Reference Example 5 is used instead of the cyclohexadiene homopolymer, to thereby obtain a maleic anhydride-modified hydrogenated cyclohexadiene homopolymer (M—PCHE). The content of maleic anhydride groups in M—PCHE is 1.47 wt % as measured by titration using sodium methylate.

Figure 3:
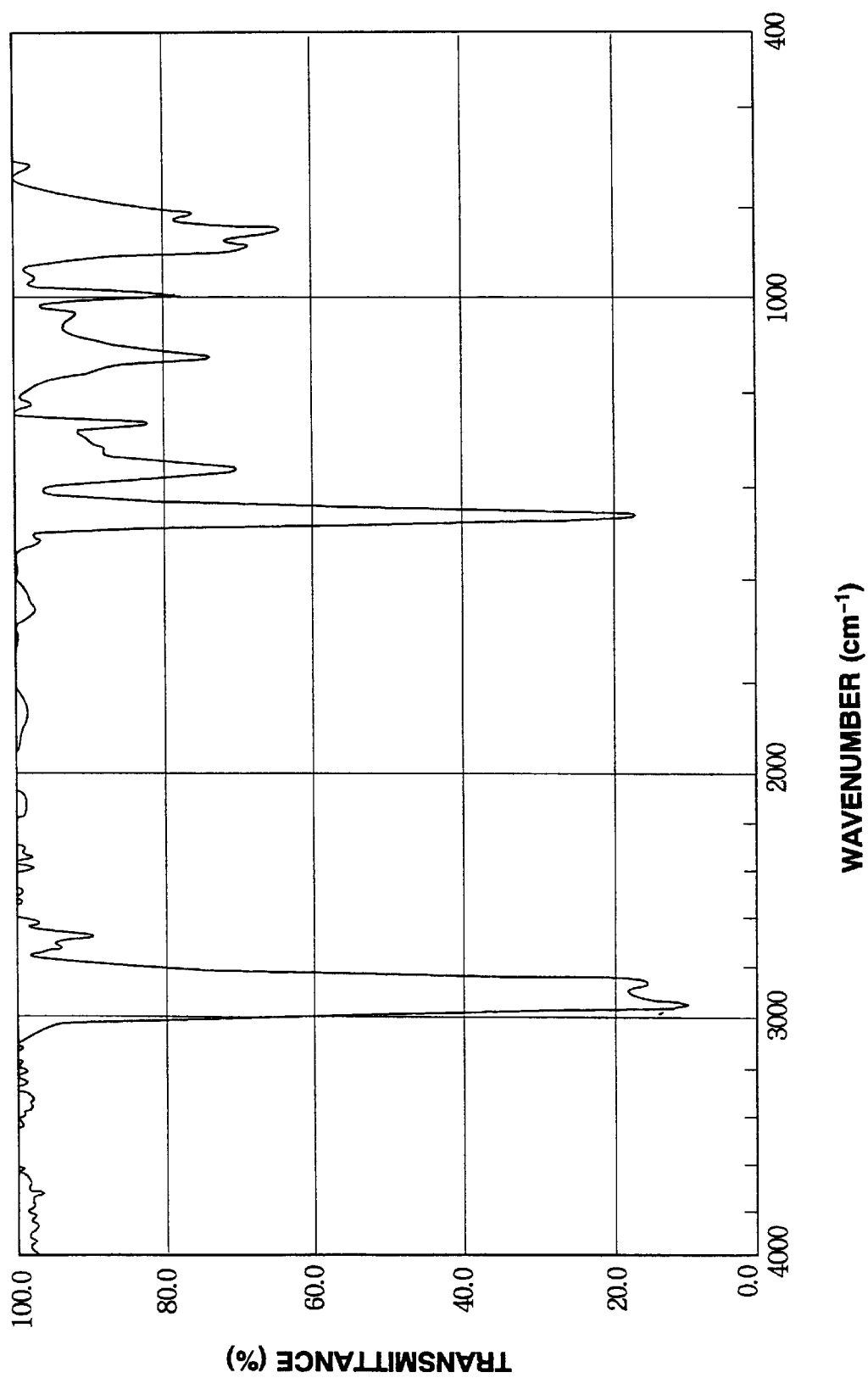
FIG. 3 is a chart showing the infrared absorption spectrum of the polycyclohexadiene homopolymer, obtained in Reference Example 5.
Figure 4:
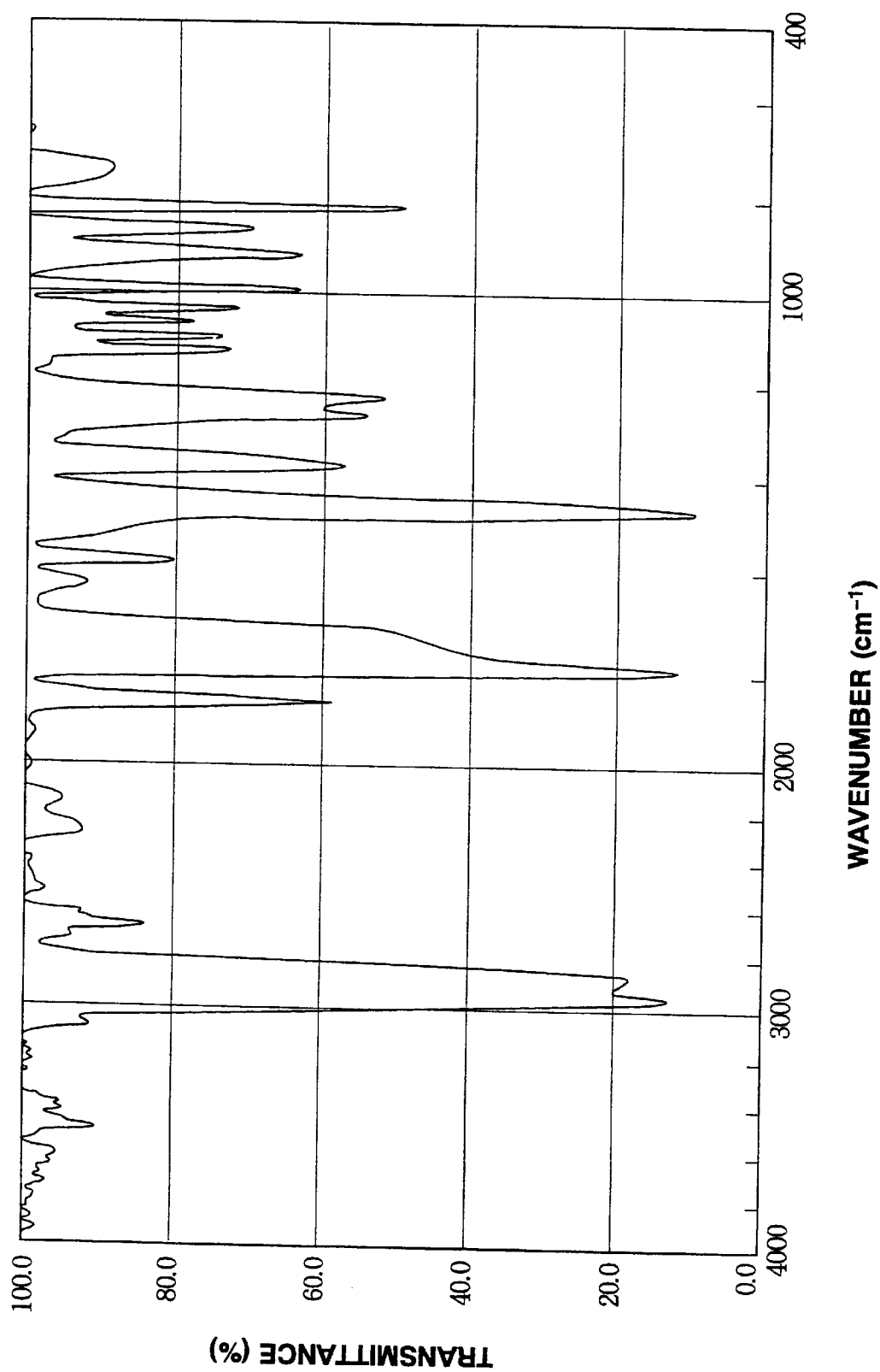
FIG. 4 is a chart showing the infrared absorption spectrum of the maleic anhydride-modified cyclohexadiene homopolymer, obtained in Example 10.

The infrared absorption spectra***) of the hydrogenated cyclohexadiene homopolymer obtained in Reference Example 5 and the maleic anhydride-modified hydrogenated cyclohexadiene homopolymer (M—PCHE) obtained in Example 10 are shown in FIG. 3 and FIG. 4, respectively.

***) The infrared absorption spectrum of each of the hydrogenated cyclohexadiene homopolymer and the maleic anhydride-modified hydrogenated cyclohexadiene homopolymer is measured as follows. A polymer is subjected to compression molding at 230° to 280° C., to thereby obtain a film. The obtained film is subjected to measurement of the infrared absorption spectrum by a reflection method or transmission method, using an infrared absorption spectrometer (IR 700) manufactured and sold by Japan Spectroscopic Co., Ltd., Japan.

EXAMPLE 11
(Modification of a hydrogenated cyclohexadiene homopolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the hydrogenated cyclohexadiene homopolymer obtained in Reference Example 5 to thereby obtain a mixture. Irganox B215 is added as a stabilizer to the obtained mixture in an amount of 3,000 ppm, based on the weight of the hydrogenated cyclohexadiene homopolymer. While melt kneading the resultant mixture at 180° to 320° C., a reaction is conducted to thereby obtain a maleic anhydride-modified hydrogenated cyclohexadiene homopolymer (M—PCHE).

EXAMPLE 12
(Modification of a hydrogenated cyclohexadiene homopolymer)

Substantially the same procedure as in Example 11 is repeated, except that glycidyl methacrylate is used as a modifying agent instead of the maleic anhydride. As a result, a glycidyl methacrylate-modified hydrogenated cyclohexadiene homopolymer (G—PCHE) is obtained.

EXAMPLE 13
(Modification of a hydrogenated cyclohexadiene homopolymer)

2.5 Parts by weight of γ-methacryloyloxypropyltrimethoxysilane (KBM-503, manufactured and sold by The Shin-Etsu Chemical Co., Ltd., Japan) and 0.5 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the hydrogenated cyclohexadiene homopolymer obtained in Reference Example 5 to thereby obtain a mixture. Irganox B215 is added as a stabilizer to the obtained mixture in an amount of 3,000 ppm, based on the weight of the hydrogenated cyclohexadiene homopolymer. While melt kneading the resultant mixture at 180° to 320° C., a reaction is conducted to thereby obtain a γ-methacryloyloxypropyltrimethoxysilane-modified hydrogenated cyclohexadiene homopolymer (Si—PCHE).

EXAMPLE 14
(Modification of a partially hydrogenated cyclohexadiene-butadiene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the partially hydrogenated cyclohexadiene-butadiene diblock copolymer obtained in Reference Example 6 to thereby obtain a mixture. Irganox B215 is added as a stabilizer to the obtained mixture in an amount of 3,000 ppm, based on the weight of the partially hydrogenated cyclohexadiene-butadiene diblock copolymer. While melt kneading the resultant mixture at 180° to 320° C., a reaction is conducted to thereby obtain a maleic anhydride-modified partially hydrogenated cyclohexadiene-butadiene diblock copolymer [M—P(CHD—Bd/EB)].

The content of maleic anhydride groups in the obtained [M—P(CHD—Bd/EB)] is measured in the same manner as in Example 1.

EXAMPLE 15
(Modification of a partially hydrogenated cyclohexadiene-butadiene diblock copolymer)

Using the partially hydrogenated cyclohexadiene-butadiene diblock copolymer obtained in Reference Example 6, substantially the same procedure as in Example 14 is repeated except that glycidyl methacrylate is used as a modifying agent instead of the maleic anhydride. As a result, a glycidyl methacrylate-modified partially hydrogenated cyclohexadiene-butadiene diblock copolymer [G—P(CHD—Bd/EB)] is obtained.

EXAMPLE 16
(Modification of a partially hydrogenated cyclohexadiene-butadiene triblock copolymer)

Substantially the same procedure as in Example 14 is repeated except that the partially hydrogenated cyclohexadiene-butadiene triblock copolymer obtained in Reference Example 7 is used. As a result, a maleic anhydride-modified partially hydrogenated cyclohexadiene-butadiene triblock copolymer [M—P(CHD—Bd/EB—CHD)] is obtained.

EXAMPLE 17
(Modification of a partially hydrogenated cyclohexadiene-butadiene triblock copolymer)

Using the partially hydrogenated cyclohexadiene-butadiene triblock copolymer obtained in Reference Example 7, substantially the same procedure as in Example 16 is repeated except that glycidyl methacrylate is used as a modifying agent instead of the maleic anhydride. As a result, a glycidyl methacrylate-modified partially hydrogenated cyclohexadiene-butadiene triblock copolymer [G—P(CHD—Bd/EB—CHD)] is obtained.

EXAMPLE 18
(Modification of a partially hydrogenated cyclohexadiene-butadiene triblock copolymer)

Substantially the same procedure as in Example 16 is repeated except that the partially hydrogenated cyclohexadiene-butadiene triblock copolymer obtained in Reference Example 8 is used. As a result, a maleic anhydride-modified partially hydrogenated cyclohexadiene-butadiene triblock copolymer [M—P(CHD—EB—CHD)] is obtained.

EXAMPLE 19
(Modification of a partially hydrogenated cyclohexadiene-butadiene triblock copolymer)

Substantially the same procedure as in Example 17 is repeated except that the partially hydrogenated cyclohexadiene-butadiene triblock copolymer obtained in Reference Example 8 is used. As a result, a glycidyl methacrylate-modified partially hydrogenated cyclohexadiene-butadiene triblock copolymer [G—P(CHD—EB—CHD)] is obtained.

EXAMPLE 20
(Modification of a hydrogenated cyclohexadiene-butadiene triblock copolymer)

Substantially the same procedure as in Example 2 is repeated except that the hydrogenated cyclohexadiene-butadiene triblock copolymer obtained in Reference Example 9 is used. As a result, a maleic anhydride-modified hydrogenated cyclohexadiene-butadiene triblock copolymer [M—P(CHE—EB—CHE)] is obtained.

EXAMPLE 21
(Modification of a hydrogenated cyclohexadiene-butadiene triblock copolymer)

Using the hydrogenated cyclohexadiene-butadiene triblock copolymer obtained in Reference Example 9, substantially the same procedure as in Example 20 is repeated except that glycidyl methacrylate is used as a modifying agent instead of the maleic anhydride. As a result, a glycidyl methacrylate-modified hydrogenated cyclohexadiene-butadiene triblock copolymer [G—P(CHE—EB—CHE)] is obtained.

EXAMPLE 22
(Modification of a cyclohexadiene homopolymer)

120 Parts by weight of maleic anhydride and 1.0 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the cyclohexadiene homopolymer employed in Example 2 to thereby obtain a mixture. Irganox B215 is added as a stabilizer to the obtained mixture in an amount of 3,000 ppm, based on the weight of the cyclohexadiene homopolymer. While melt kneading the resultant mixture at 180° to 290° C., a reaction is conducted to thereby obtain a maleic anhydride-modified cyclohexadiene homopolymer (M—PCHD).

The content of maleic anhydride groups in the obtained M—PCHD is 62 wt %.

EXAMPLE 23 and 24
(Modification of a partially hydrogenated cyclohexadiene-butadiene diblock copolymer and a partially hydrogenated cyclohexadiene-butadiene triblock copolymer)

120 Parts by weight of maleic anhydride and 1.0 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to each of the unmodified polymers used in Examples 14 and 16 to thereby obtain mixtures. Irganox B215 is added as a stabilizer to each of the obtained mixtures in an amount of 3,000 ppm, based on the weight of the respective unmodified polymer. While melt kneading the resultant mixtures at 180° to 230° C. individually, a reaction is conducted to thereby obtain maleic anhydride-modified polymers [M—P(CHD—Bd/EB) and M—P(CHD—Bd/EB—CHD)].

The contents of maleic anhydride groups in the obtained M—P(CHD—Bd/EB) and M—P(CHD—Bd/EB—CHD) are 69 wt % and 60 wt %, respectively.

EXAMPLE 25
(Modification of a hydrogenated cyclohexadiene-styrene diblock copolymer)

2.5 Parts by weight of maleic anhydride and 0.2 part by weight of 2,5-dimethyl-2,5-di(tert-butyl peroxy)hexane having a purity of 90% or more (Perhexa 25B, manufactured and sold by Nippon Oil & Fats Co., Ltd., Japan) are added to 100 parts by weight of the hydrogenated cyclohexadiene-styrene diblock copolymer obtained in Reference Example 10 to thereby obtain a mixture. Irganox B215 is added as a stabilizer to the obtained mixture in an amount of 3,000 ppm, based on the weight of the hydrogenated cyclohexadiene-styrene diblock copolymer. While melt kneading the resultant mixture at 180° to 230° C., a reaction is conducted to thereby obtain a maleic anhydride-modified hydrogenated cyclohexadiene-styrene diblock copolymer [M—P(CHE—VCH)].

The content of maleic anhydride groups in the obtained M—P(CHE-VCH) is measured in the same manner as in Example 1.

EXAMPLE 26
(Cyclohexadiene-methyl methacrylate diblock copolymer)

A well dried 100 ml Schlenk tube is purged with dried argon gas by a conventional method. 1.50 g of 1,3-cyclohexadiene, 18.0 g of cyclohexane and 2.0 g of n-hexane are charged in the Schlenk tube. While maintaining the temperature of the resultant solution at room temperature, a catalyst (complex), which is obtained in the same manner as in Reference Example 1, is added to the solution in an amount of 0.07 mmol in terms of the amount of lithium atom, and a polymerization reaction is conducted at 30° C. for 4 hours in a dried argon atmosphere, to thereby obtain a cyclohexadiene homopolymer. Subsequently, the resultant polymerization reaction system is cooled to $-10°$ C. Then, 1.50 g of methyl methacrylate (MMA) is added to the polymerization reaction system, and the polymerization reaction is further conducted at $-10°$ C. for 3 hours, to thereby obtain a cyclohexadiene-methyl methacrylate diblock copolymer.

After that period of time, a 10 wt % solution of BHT [2,6-bis(tert-butyl)-4-methylphenol] in methanol is added to the polymerization reaction system, to thereby terminate the polymerization reaction. Then, a large amount of a mixed solvent of methanol and hydrochloric acid is added to the resultant polymerization reaction mixture, thereby separating a polymer formed therein. The separated polymer is washed with methanol and then, dried at 80° C. in vacuo, thereby obtaining a white mass of the cyclohexadiene-methyl methacrylate diblock copolymer in a yield of 81 wt %.

Figure 5:
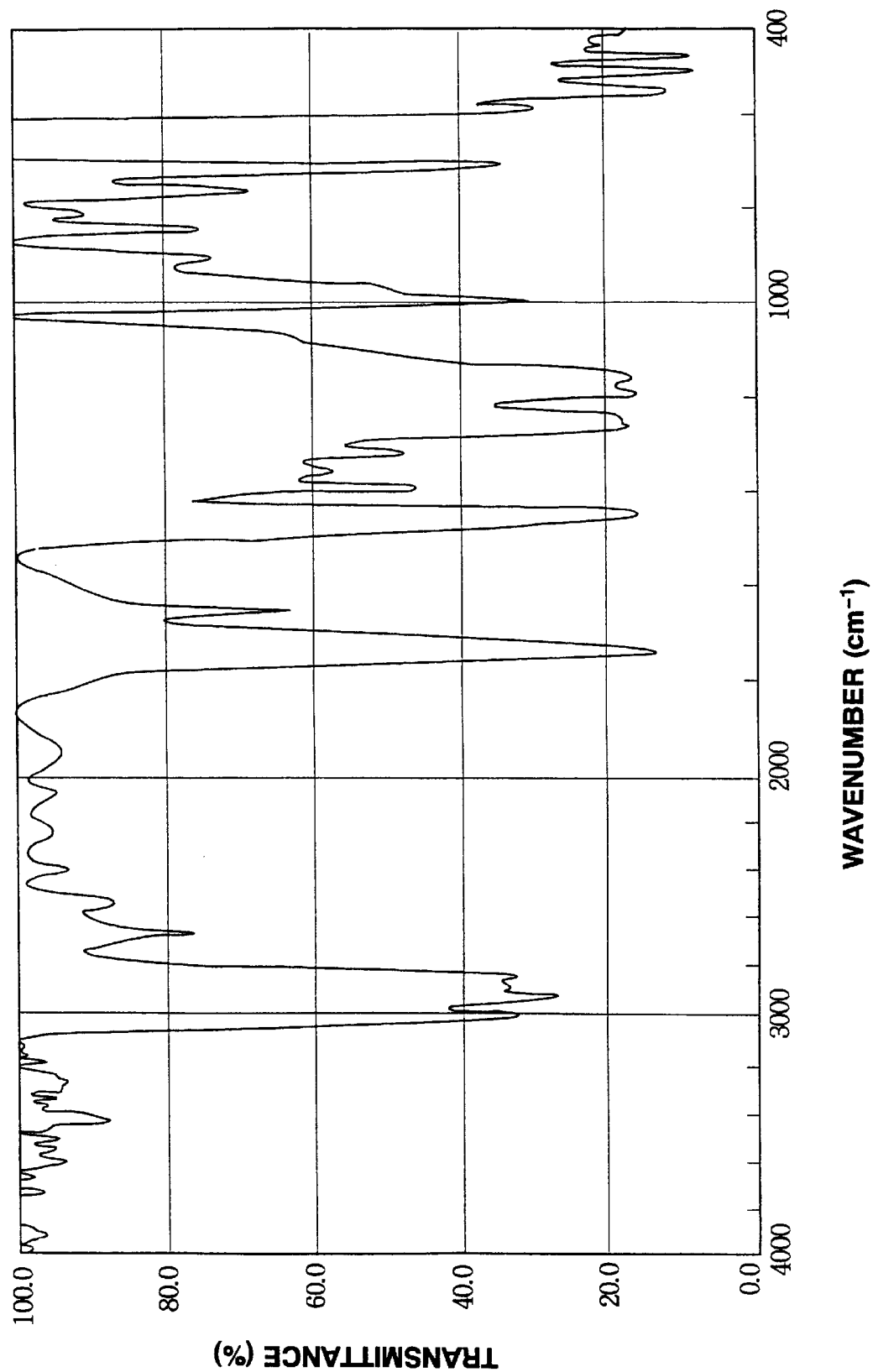
FIG. 5 is a chart showing the infrared absorption spectrum of the cyclohexadiene-methyl methacrylate diblock copolymer, obtained in Example 26.

The number average molecular weight $(\overline{Mn})$*) of the obtained diblock copolymer is 34,500. The molecular weight distribution $(\overline{Mw}/\overline{Mn})$*) is 1.89. The infrared absorption spectrum***) of the cyclohexadiene-methyl methacrylate diblock copolymer is shown in FIG. 5.

***) The infrared absorption spectrum of the cyclohexadiene-methyl methacrylate diblock copolymer is obtained by the following measuring method. A polymer is subjected to compression molding at 230° to 280° C., to thereby obtain a film. The obtained film is subjected to infrared absorption spectroscopic analysis by reflection method or transmission method, using an infrared absorption spectrometer (IR 700) manufactured and sold by Japan Spectroscopic Co., Ltd., Japan.

With respect to each of Examples 2 to 9, 11 to 21 and 25, the content of functional groups in the modified polymer are shown in Table 1.

TABLE 1

Content of functional groups in the modified polymer

| Examples | Modified polymer | Reactive agent for modification | Content of functional groups in the modified polymer (wt %) |
|---|---|---|---|
| Example 2 | M-PCHD*4) | MAH*1) | 1.1 |
| 3 | G-PCHD*4) | GMA*2) | 1.3 |
| 4 | Si-PCHD*4) | MPTMS*3) | 0.7 |
| 5 | M-P (CHD*4)-Bd*5)) | MAH*1) | 1.4 |
| 6 | G-P (CHD*4)-Bd*5)) | GMA*2) | 1.9 |
| 7 | M-P (CHD*4)-Bd*5)-CHD*4)) | MAH*1) | 1.4 |
| 8 | G-P (CHD*4)-Bd*5)-CHD*4)) | GMA*2) | 2.0 |
| 9 | M-P (CHD*4)-St*6)) | MAH*1) | 0.6 |
| 11 | M-PCHE*7) | MAH*1) | 1.4 |
| 12 | G-PCHE*7) | GMA*2) | 2.6 |
| 13 | Si-PCHE*7) | MPTMS*3) | 0.9 |
| 14 | M-P (CHD*4)-Bd/EB*8)) | MAH*1) | 1.3 |
| 15 | G-P (CHD*4)-Bd/EB*8)) | GMA*2) | 1.75 |
| 16 | M-P (CHD*4)-Bd/EB*8)-CHD*4)) | MAH*1) | 1.5 |
| 17 | G-P (CHD*4)-Bd/EB*8)-CHD*4)) | GMA*2) | 1.9 |
| 18 | M-P (CHD*4)-EB*9)-CHD*4)) | MAH*1) | 1.5 |
| 19 | G-P (CHD*4)-EB*9)-CHD*4)) | GMA*2) | 1.7 |
| 20 | M-P (CHE*7)-EB*9)-CHE*7)) | MAH*1) | 1.0 |
| 21 | G-P (CHE*7)-EB*9)-CHE*7)) | GMA*2) | 1.2 |
| 25 | M-P (CHE*7)-VCH*10)) | MAH*1) | 0.7 |

*1)MAH: maleic anhydride
*2)GMA: glycidyl methacrylate
*3)MPTMS: γ-methacryloyloxppropyltrimethoxysilane
*4)CHD: unhydrogenated cyclohexadiene polymer block
*5)Bd: unhydrogenated butadiene polymer block
*6)St: unhydrogenated styrene polymer block
*7)CHE: 100% hydrogenated cyclohexadiene polymer block
*8)Bd/EB: partially hydrogenated butadiene polymer block
*9)EB: 100% hydrogenated butadiene polymer block
*10)VCH: 100% hydrogenated styrene polymer block Measurement of the dynamic viscoelasticity of modified polymers From each of the modified polymers obtained in Examples 1 to 21, a test specimen in the form of a plate is prepared using a thermal compression molding machine. With respect to the test specimen, a change in tan δ, which is defined as a ratio E"/E' (wherein E' is a storage elastic modulus and E" is a loss elastic modulus), according to the temperature change is measured using an apparatus for measuring dynamic viscoelasticity (DMA: manufactured and sold by DuPont Instrument, U.S.A.). As a result, it is confirmed that each of the modified polymers shows a peak around 120°–150° C. (ascribed to a cyclohexadiene ring) and another peak around 200°–220° C. (ascribed to a cyclohexane ring).

INDUSTRIAL APPLICABILITY

The novel modified cyclic monomer unit-containing polymer of the present invention has excellent thermal properties, and is also advantageous in that it can be provided in the form of a modified copolymer of a cyclic olefin monomer and/or a cyclic conjugated diene monomer with a comonomer copolymerizable with the cyclic monomer, wherein the content of comonomer and the configuration of copolymer can be appropriately selected in accordance with desired thermal and mechanical properties. The polymer of the present invention can be advantageously used either singly or in combination with inorganic materials as well as another resin material, depending on the intended use. The polymer of the present invention can be advantageously used as various industrial materials, such as a plastic, a thermoplastic elastomer, a crosslinked elastomer, a fiber, a sheet, a film, a tube, a tire, a belt, an insulating material, an organic glass, an adhesive, a food container, a packing material, and a modifier for other resins, in a wide variety of application fields, such as automobile parts, electric parts, electronic parts, general miscellaneous goods, food containers, packaging materials and medical equipment parts.

We claim:

1. A polymer containing a modified cyclic monomer unit, comprising a polymer chain represented by the following formula (I):

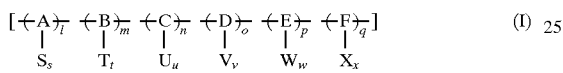 (I)

wherein A to F are monomer units constituting a main chain of said polymer chain, in which monomer units A to F are arranged in any order, and l to q are, respectively, weight percentages of monomer units A to F, based on the total weight of monomer units A to F;
wherein:
each A is independently selected from the group consisting of cyclic olefin monomer units represented by the following formula (IV):

 (IV)

wherein each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom,
each B is independently selected from the group consisting of cyclic conjugated diene monomer units represented by the following formula (V):

 (V)

wherein each $R^2$ is as defined for formula (IV),
each C is independently selected from the group consisting of chain conjugated diene monomer units,
each D is independently selected from the group consisting of vinyl aromatic monomer units,
each E is independently selected from the group consisting of polar monomer units, and
each F is independently selected from the group consisting of an ethylene monomer unit and α-olefin monomer units;

wherein:
l to q satisfy the following requirements:

$l+m+n+o+p+q=100$, $0 \leq l \leq 100$, $0 \leq m \leq 100$, $0 \leq n < 100$, $0 \leq o < 100$, $0 \leq p < 100$, $0 \leq q < 100$, and $l+m \neq 0$;

wherein each of S to X, which are modifying groups and which are the same or different, is independently a functional group or an organic compound residue containing said functional group, said functional group containing at least one member selected from the group consisting of oxygen, nitrogen, sulfur, silicon, phosphorus and halogen, including fluorine, chlorine, bromine and iodine; and
wherein s to x are, respectively, weight percentages of modifying groups S to X, based on the weight of said polymer, and satisfy the following requirements:

$0 < s+t+u+v+w+x < 100$, $0 \leq s < 100$, $0 \leq t < 100$, $0 \leq u < 100$, $0 \leq v < 100$, $0 \leq w < 100$, and $0 \leq x < 100$, said polymer having a number average molecular weight of from 10,000 to 5,000,000, and
wherein when $0<l+m<100$, said polymer is a block copolymer which contains at least one polymer block containing a contiguous arrangement of at least 10 monomer units selected from the group consisting of said A monomer unit, said B monomer unit and mixtures thereof.

2. A method for producing a polymer containing a modified cyclic monomer unit, comprising a polymer chain represented by the following formula (I):

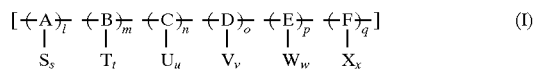 (I)

wherein A to F are monomer units constituting a main chain of said polymer chain, in which monomer units A to F are arranged in any order, and l to q are, respectively, weight percentages of monomer units A to F, based on the total weight of monomer units A to F;
wherein:
each A is independently selected from the group consisting of cyclic olefin monomer units, each B is independently selected from the group consisting of cyclic conjugated diene monomer units, each C is independently selected from the group consisting of chain conjugated diene monomer units, each D is independently selected from the group consisting of vinyl aromatic monomer units, each E is independently selected from the group consisting of polar monomer units, and each F is independently selected from the group consisting of an ethylene monomer unit and α-olefin monomer units;

wherein:

l to q satisfy the following requirements:

$$l+m+n+o+p+q=100,$$

$$0 \leq l \leq 100,$$

$$0 \leq m \leq 100,$$

$$0 \leq n < 100,$$

$$0 \leq o < 100,$$

$$0 \leq p < 100,$$

$$0 \leq q < 100,$$

and $$l+m \neq 0;$$

wherein each of S to X, which are modifying groups and which are same or different, is independently a functional group or an organic compound residue containing said functional group, said functional group containing at least one member selected from the group consisting of oxygen, nitrogen, sulfur, silicon, phosphorus and halogen, including fluorine, chlorine, bromine and iodine; and wherein s to x are, respectively, weight percentages of modifying groups S to X, based on the weight of said polymer, and satisfy the following requirements:

$$0 < s+t+u+v+w+x < 100,$$

$$0 \leq s < 100,$$

$$0 \leq t < 100,$$

$$0 \leq u < 100,$$

$$0 \leq v < 100,$$

$$0 \leq w < 100,$$

and $$0 \leq x < 100,$$

which comprises reacting a cyclic monomer unit-containing polymer comprising a main chain represented by the following formula (I'):

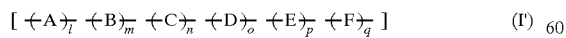  (I')

wherein A to F are monomer units constituting said main chain in which monomer units A to F are arranged in any order, and l to q are, respectively, weight percentages of monomer units A to F, based on the total weight of monomer units A to F;

wherein:

each A is independently selected from the group consisting of cyclic olefin monomer units, each B is independently selected from the group consisting of cyclic conjugated diene monomer units, each C is independently selected from the group consisting of chain conjugated diene monomer units, each D is independently selected from the group consisting of vinyl aromatic monomer units, each E is independently selected from the group consisting of polar monomer units, and each F is independently selected from the group consisting of an ethylene monomer unit and α-olefin monomer units;

wherein:

l to q satisfy the following requirements:

$$l+m+n+o+p+q=100,$$

$$0 \leq l \leq 100,$$

$$0 \leq m \leq 100,$$

$$0 \leq n < 100,$$

$$0 \leq o < 100,$$

$$0 \leq o < 100,$$

$$0 \leq p < 100,$$

$$0 \leq q < 100,$$

and $$l+m \neq 0;$$

wherein each of S to X, which are modifying groups and which are the same or different, is independently a functional group or an organic compound residue containing said functional group, said functional group containing at least one member selected from the group consisting of oxygen, nitrogen, sulfur, silicon, phosphorus and halogen, including fluorine, chlorine, bromine and iodine; and wherein s to x are, respectively, weight percentages of modifying groups S to X, based on the weight of said polymer, and satisfy the following requirements:

$$0 < s+t+u+v+w+x < 100,$$

$$0 \leq s < 100,$$

$$0 \leq t < 100,$$

$$0 \leq u < 100,$$

$$0 \leq v < 100,$$

$$0 \leq w < 100,$$

and $$0 \leq x < 100,$$

with a reactive reagent containing at least one modifying group selected from the group consisting of a functional group and an organic compound residue containing said functional group, said functional group containing at least one member selected from the group consisting of oxygen, nitrogen, sulfur, silicon, phosphorus and halogen, including fluorine, chlorine, bromine and iodine, thereby bonding said at least one modifying group to said cyclic monomer unit-containing polymer by an addition reaction.

3. The polymer according to claim 1, wherein l=100.

4. The polymer according to claim 1, wherein m=100.

5. The polymer according to claim 1, wherein l+m=100 and l>0.

6. The polymer according to claim 1, wherein 0<l+m<100.

7. The polymer according to claim 1, wherein said polymer block consists of said A monomer unit and said B monomer unit.

8. The polymer according to claim 1, wherein said polymer block consists of A monomer units.

9. The polymer according to claim 1, wherein said polymer block consists of B monomer units.

10. The polymer according to any one of claims 3–6, 7–9 and 1, wherein each of S to X is independently a functional group or an organic compound residue containing said functional group, said functional group being at least one member selected from the group consisting of a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido group, an amidine group, a nitrile group, a nitro group, an isocyano group, a cyanato group, an isocyanato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehydo group, a thioketone group, a phosphoric acid group, a phosphonic acid group and a phosphinic acid group.

11. The polymer according to any one of claims 3–6, 7–9 and 1, wherein each of S to X is independently a functional group or an organic compound residue containing said functional group, said functional group being at least one member selected from the group consisting of a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group.

12. The method according to claim 2, wherein said reactive reagent comprises at least one compound selected from the group consisting of i) an unsaturated carboxylic acid or a derivative thereof, ii) an epoxy compound and iii) an organic silicon compound.

* * * * *